US008438429B2

(12) United States Patent
Takada

(10) Patent No.: US 8,438,429 B2
(45) Date of Patent: May 7, 2013

(54) STORAGE CONTROL APPARATUS AND STORAGE CONTROL METHOD

(75) Inventor: Masanori Takada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 217 days.

(21) Appl. No.: 13/000,007

(22) PCT Filed: Dec. 1, 2010

(86) PCT No.: PCT/JP2010/007012
§ 371 (c)(1),
(2), (4) Date: Dec. 17, 2010

(87) PCT Pub. No.: WO2012/073287
PCT Pub. Date: Jun. 7, 2012

(65) Prior Publication Data
US 2012/0144252 A1    Jun. 7, 2012

(51) Int. Cl.
*G11C 29/00*    (2006.01)
(52) U.S. Cl.
USPC .......................................................... 714/702
(58) Field of Classification Search .................. 714/702, 714/E11.179, E11.001
See application file for complete search history.

(56) References Cited

U.S. PATENT DOCUMENTS

| | | | |
|---|---|---|---|
| 2002/0004921 A1* | 1/2002 | Muranaka et al. | 714/704 |
| 2006/0047898 A1* | 3/2006 | Ishida et al. | 711/112 |
| 2006/0107177 A1* | 5/2006 | Ishii | 714/758 |
| 2006/0123320 A1 | 6/2006 | Vogt | |
| 2007/0214312 A1* | 9/2007 | Tashiro et al. | 711/112 |
| 2009/0006890 A1 | 1/2009 | Takada et al. | |
| 2009/0164691 A1* | 6/2009 | Wang et al. | 710/309 |
| 2009/0235145 A1* | 9/2009 | Ito et al. | 714/764 |
| 2010/0115217 A1* | 5/2010 | Oh et al. | 711/162 |
| 2010/0122148 A1* | 5/2010 | Flynn et al. | 714/773 |
| 2011/0004709 A1* | 1/2011 | Gower et al. | 710/51 |

(Continued)

FOREIGN PATENT DOCUMENTS

| | | |
|---|---|---|
| EP | 1 918 939 A1 | 5/2008 |
| EP | 1 956 485 A1 | 8/2008 |
| JP | 2008-521160 | 6/2008 |
| JP | 2009-009200 | 1/2009 |

OTHER PUBLICATIONS

PCT International Search Report and Written Opinion on application PCT/JP2010/007012 mailed Jan. 3, 2012; 16 pages.

*Primary Examiner* — Cynthia Britt
*Assistant Examiner* — Thien D Nguyen
(74) *Attorney, Agent, or Firm* — Foley & Lardner LLP

(57) ABSTRACT

Memory module groups are provided which include a memory module, which includes memory chips. In the case in which an error chip that is a memory chip that is provided with an error is in a first memory module, a first memory module group that is provided with the error chip is not managed as a memory module group that cannot be used even if an error of the first data element is mis-corrected based on the error detecting code of the first kind. In the case in which an error chip is in a second memory module, a second memory module group that is provided with the error chip is not managed as a memory module group that cannot be used in such a manner that an error of the second data element is not mis-corrected based on the error detecting code of the second kind.

19 Claims, 18 Drawing Sheets

U.S. PATENT DOCUMENTS

2011/0066793 A1* 3/2011 Burd .............................. 711/103
2011/0271048 A1* 11/2011 Fuji et al. ...................... 711/113
2012/0144252 A1* 6/2012 Takada .......................... 714/702
2012/0311408 A1* 12/2012 Nakanishi et al. ............ 714/773

* cited by examiner

FIG.12

| Storage Controller Hardware Status | |
|---|---|
| Maintenance | Needed |
| Performance | Degradated |
| Redundancy | Normal |
| ECC GROUP #0 | OK |
| ECC GROUP #1 | Need to maintenance |
| ECC GROUP #2 | Disabled |
| ⋮ | ⋮ |

STORAGE CONTROL APPARATUS AND STORAGE CONTROL METHOD

TECHNICAL FIELD

The present invention relates to a storage control apparatus that is configured to store data into a memory in accordance with an access command that is transmitted from a host computer.

BACKGROUND ART

A storage system that is configured by a plurality of physical storage devices (such as an HDD (Hard Disk Drive) and a flash memory device) is known publicly. As a storage system, there can be known publicly for instance a system that is provided with a cache memory that stores data that can be read and written in addition to a simple read and write function, a redundant controller system, and a system that is provided with a snapshot function that carries out a duplication of a volume in little time.

Such a storage system is provided with a wide variety of functions as described above. In recent years, such a storage system has been provided with a memory with a large capacity, a DRAM (Dynamic Random Access Memory) in a quintessential way in order to implement a cache memory. The DRAM stores data that is used for a host computer (data that is read or written by a host computer, hereafter referred to as a user data) and data that is used inside a storage system to implement a wide variety of functions (hereafter referred to as a control data).

On the other hand, it is publicly known that an error occurs for a DRAM. The error is that a minimum access unit to one chip is increased, the number of chips that can be read or written at one time is decreased, and incorrect data is stored for instance. The technique for adding an error correcting code (ECC) and enabling a data error correction and a detection in the case in which an error occurs is publicly known (see Patent Literature 1).

Moreover, a method for carrying out an appropriate control in the case in which a DRAM error occurs and for maintaining the availability and a reliability of a storage system has been disclosed. For instance, Patent Literature 2 discloses a processing method of a storage system in the case in which a DRAM error occurs.

CITATION LIST

Patent Literature

[PTL 1]
Japanese Patent Application Laid-Open Publication No. 2008-521160
[PTL 2]
Japanese Patent Application Laid-Open Publication No. 2009-9200

SUMMARY OF INVENTION

Technical Problem

Patent Literature 1 describes that there are a plurality of methods for adding an ECC. However, Patent Literature 1 does not disclose which method is used for a storage system and how the method is used for a storage system. Consequently, a mis-correction may be carried out depending on a method for adding an ECC in some cases and there is a problem for the reliability.

Patent Literature 2 describes an invention for disabling a memory module that is provided with an error and preventing the memory module from being used in the case in which a memory error occurs. However, in Patent Literature 2 a memory module that is provided with an error is disabled in a timely fashion, whereby there is a problem for the availability in which an operation may not be carried out by remaining normal components.

The above problem may also exist for a storage control apparatus other than a storage system in a similar way.

Consequently, an object of the present invention is to improve at least two trade-offs of a performance, a reliability, and availability for a storage control apparatus.

Solution of Problem

A storage control apparatus is provided with a first memory area, a second memory area, and a controller.

The first memory area is provided with at least one first memory module group, each of the first memory module group is provided with at least one first memory module, and each of the first memory module is provided with a plurality of memory chip. The second memory area is provided with at least one second memory module group, each of the second memory module group is provided with at least one second memory module, and each of the second memory module is provided with a plurality of memory chip.

The controller is coupled to the first memory area and the second memory area. In the case in which the controller writes the first data to the first memory area, the controller adds an error detecting code of the first kind to a first data element that is an element of the first data and then writes the first data to the first memory area. In the case in which the controller writes the second data to the second memory area, the controller adds an error detecting code of the first kind to a second data element that is an element of the second data and then writes the second data to the second memory area.

In the case in which an error chip that is a memory chip that is provided with an error is a memory chip in the first memory module, the controller does not manage a first memory module group that is provided with the error chip as a memory module group that cannot be used even if there is a possibility that an error of the first data element is mis-corrected based on the error detecting code of the first kind. Moreover, in the case in which an error chip that is a memory chip that is provided with an error is a memory chip in the second memory module, the controller manages a second memory module group that is provided with the error chip as a memory module group that cannot be used in such a manner that an error of the second data element is not mis-corrected based on the error detecting code of the second kind.

A storage control apparatus can be a storage system that is provided with at least one physical storage device and can be a switch apparatus that is disposed between a storage system and a host computer.

BRIEF DESCRIPTION OF DRAWINGS

FIG. 12 is a view showing an example of a management screen.

DESCRIPTION OF EMBODIMENTS

An embodiment (example) of the present invention will be described below in detail with reference to the drawings. Here, elements that are common in each of the drawings are numerically numbered similarly for reference.

The management computer can be configured by at least one computer. More specifically, the management computer can display the information or can transmit the information that is to be displayed to a remote computer for instance. Moreover in the case in which a function that is equivalent to a management computer is implemented by a plurality of computers for instance, the plurality of computers (that can include a computer for a display in the case in which a display is executed by a computer for a display) can be a management computer.

In the following descriptions, a processing will be described in some cases while a "program" is a subject. However, since a program executes a predetermined processing while using a storage resource (such as a memory) and/or a communication interface device (such as a communication port) by being executed by a processor (such as a CPU (Central Processing Unit)), a subject of a processing can also be a processor. A processing that is described while a "program" is a subject can also be a processing that is executed by a storage controller, a controller board, or a management computer. Moreover, a processor can also include a hardware circuit that executes a part or a whole of a processing that is executed by a processor. A computer program can be installed to each of computers from a program source. The program source can also be a program distribution server or a storage medium for instance.

EMBODIMENT 1

In accordance with the present embodiment, the availability of a whole of a storage system can be maintained, and the reliability and a performance of a storage system can be achieved at the same time. A first embodiment of the present invention will be described below in detail with reference to the drawings.

Figure 1:
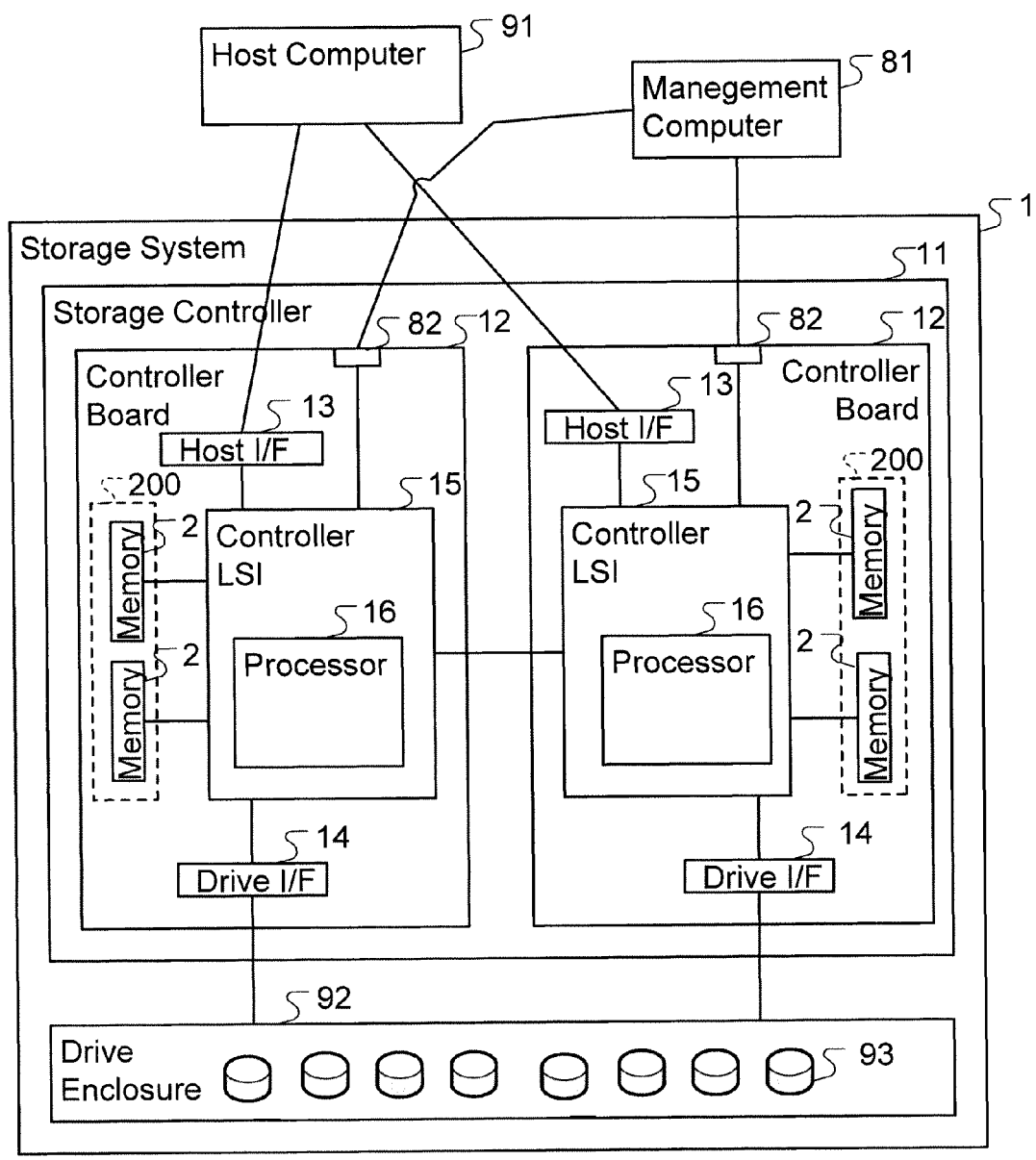
FIG. 1 is a view showing an example of a computer system that is provided with a storage system in accordance with a first embodiment of the present invention.

FIG. 1 is a view showing an example of a computer system that is provided with a storage system in accordance with a first embodiment of the present invention.

The computer system is provided with a host computer 91, a management computer 81, and a storage system 1.

The host computer 91 is a computer that is provided with a function that issues an I/O (Input/Output) command for reading or writing data for the storage system 1. The host computer 91 is coupled to the storage system 1 by a host interface 13.

The management computer 81 is a computer that is provided with a function that manages a status of the storage system 1. The management computer 81 is coupled to the storage system 1 by a management interface 82.

The storage system 1 is provided with a storage controller 11 and a drive enclosure 92. The storage controller 11 communicates with the host computer 91 and the management computer 81, and controls a drive 93 in the drive enclosure 92.

The drive 93 is an HDD. As substitute for the HDD, a storage device of other type, for instance a flash memory device such as an SSD (Solid State Drive), can also be adopted.

A plurality of drives 93 is disposed in the drive enclosure 92, and a plurality of LV (Logical Volumes) is formed based on the plurality of drives 93. The LV is specified by an I/O command from the host computer 91, and data is read or written. The data that is read from or written to the LV is read from or written to at least one drive 93 that is a basis of the LV via a cache (a memory module 2). The LV is not restricted to an LV that is based on at least one drive 93, and other LV, for instance a virtual LV that complies with Thin Provisioning, can also be adopted.

The storage controller 11 is provided with two controller boards 12. It is also possible to dispose a single controller board 12 or three controller boards 12 or more.

Each of the controller boards 12 is provided with a host interface 13, a management interface 82, a drive interface 14, a memory module 2, and a controller LSI 15. It is also possible to dispose two memory modules 2 as shown in the figure, a single memory module 2, or three memory modules 2 or more. The memory modules 2 configure the memory module groups 200 of two types.

The host interface 13 couples the storage controller 11 and the host computer 91 with each other. The host interface 13 is provided with a function for converting a first protocol (such as an FC (Fibre Channel), an FCoE (Fibre Channel Over Ethernet), and an iSCSI (internet Small Computer System Interface)) into a second protocol (such as a PCI-Express) that is used in the storage controller 11, and is provided with a function for converting a second protocol into a first protocol.

The management interface 82 is used to make both of the storage controller 11 and a management computer 81 to communicate with each other. The management interface 82 is a NIC (Network Interface Card) for instance.

The drive interface 14 is used to make both of the storage controller 11 and the drive enclosure 92 to communicate with each other. The drive interface 14 is provided with a function for converting a third protocol (such as an FC and a SAS (Serial Attached SCSI)) into a second protocol described above, and is provided with a function for converting a second protocol into a third protocol.

The controller LSI 15 is provided with a function for executing a data transfer among the memory module 2, the host interface 13, and the drive interface 14. Moreover, the controller LSI 15 is provided with a processor 16 that is configured to operate a storage control program (a program for controlling the storage system 1). Although the processor 16 is configured as a part of the controller LSI 15 in the figure, the processor 16 can also be configured in an independent manner from the controller LSI 15.

The memory module 2 (the memory module group 200) stores the user data that is read from or written to the host computer 91 and the control data that is required to operate the controller LSI 15. A series of memory addresses is allocated to the memory module 2. The controller LSI 15, the host interface 13, and the drive interface 14 can access an appropriate memory module 2 by using the above described memory addresses. The memory module 2 and the controller LSI 15 are coupled with each other by a prescribed interface (such as a DRAM (Dynamic Random Access Memory) interface, a DDR3 (Double Data Rate 3), and a DDR4). One or a plurality of memory modules 2 configures a plurality of memory module groups 200.

Figure 2:
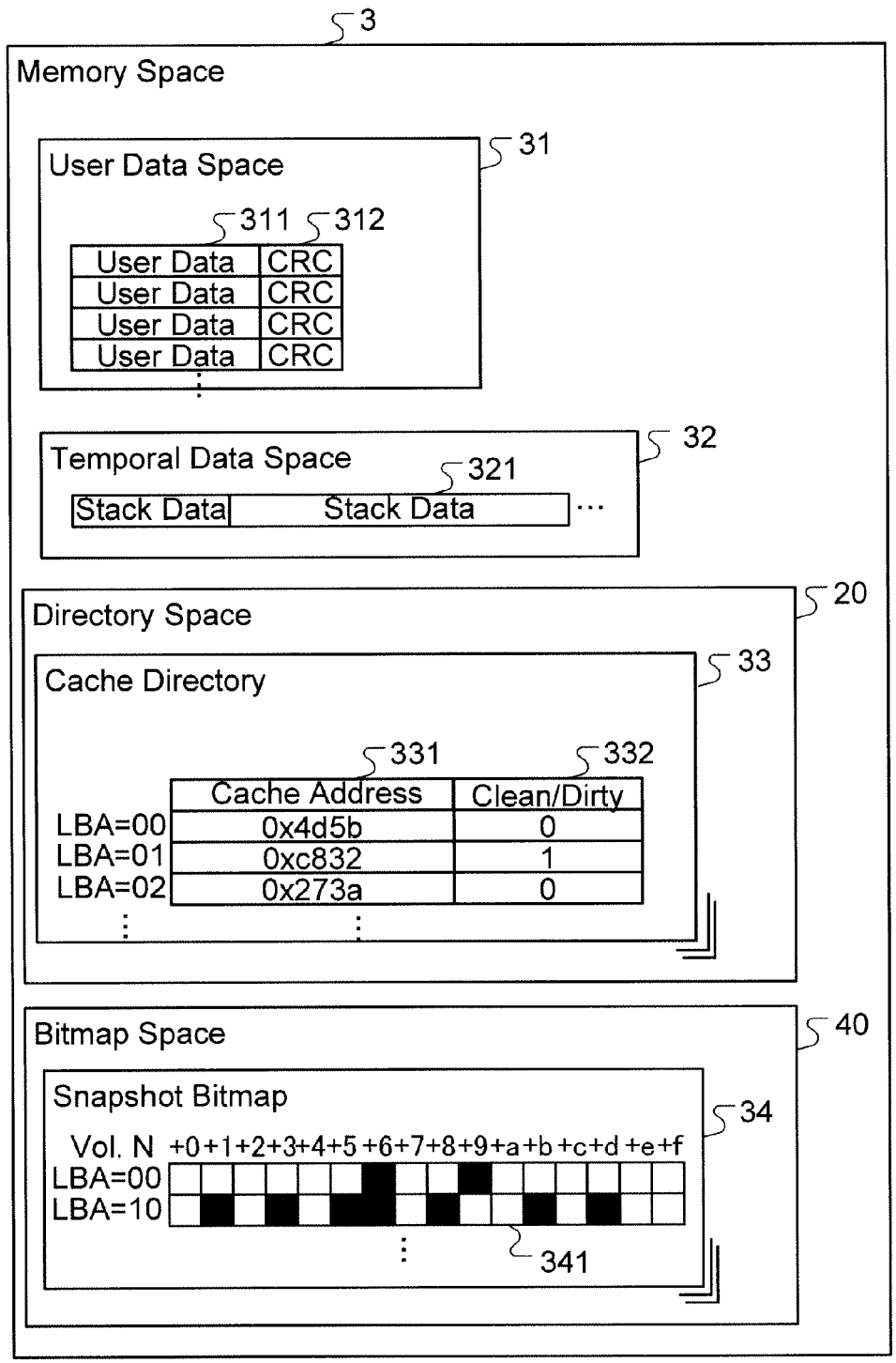
FIG. 2 is a view showing an example of data that is handled by a storage system.

FIG. 2 is a view showing an example of data that is handled by the storage system 1.

A wide variety of data that is handled by the storage system 1 is stored into a memory area 3. The memory area 3 is an area that is configured by at least one memory module 2 that is included in one controller board 12. The data that exists in the memory area 3 is stored into the above described memory module 2 in a practical sense.

The memory area 3 is divided into a user data area 31, a temporal data area 32, a directory area 20, and a bitmap area 40 in a logical fashion.

The user data area 31 is used in the case in which a user data transfer is relayed between the host computer 91 and the drive 93 or in order to cache data in such a manner that data that is read or written on a number of occasions is accessed at a fast pace.

The user data 311 is stored into the user data area 31. The user data 311 is data that is read from or written to the host computer 91. Each element of the user data 311 is called a block (a block is provided with a fixed length). The user data 311 is stored into the user data area 31 in the state in which a CRC (Cyclic Redundancy Check) 312 has been added to the user data 311. An error detecting code of the other kind as substitute for the CRC can also be added to the user data.

A T10 DIF (T10 Data Integrity Field) can be mentioned as the CRC code 312 for instance. Even in the case in which an error occurs in the user data 311, the error that has occurred in the user data 311 can be detected by a mismatch with the CRC code that is corresponded to the user data 311.

A size of the user data 311 is a minimum unit of data that is read from or written to the host computer 91 or data that is transmitted from or to the drive 93, and is 512 bytes or 4 kbytes in general. The CRC code 312 is 8 bytes in general. A read or a write of the user data 311 is executed with a set of the CRC code 312 that is corresponded to the user data 311.

In the case in which a read or a write of data becomes unable and the data is data (a read cache) that has been read from the drive 93 and that has been stored into a cache (the memory module 2), the data can be restored to its former state by reading the data from the drive 93 again. In the case in which the data is data (a write cache) that has been written from the host computer 91 to a cache (the memory module 2), the data can be restored to its former state from the other normal controller board 12 by duplicating data between a plurality of controller boards 12. In the case in which data is duplicated as described above, an influence to the whole of the storage system 1 can be reduced even if a read or a write of data becomes unable.

The temporal data area 32 stores the stack data 321 (for instance, a local variable that is handled by a storage control program that is operated by the processor 16). The stack data 321 is accessed in any length from the minimum length of 1 byte unlike the user data 311. The CRC code that is configured to obtain a reliability assurance is not added to the stack data 321.

A cache directory 33 is stored into the directory area 20. The cache directory 33 stores the information that is configured to manage the data that has been stored into the user data area 31 (the data that is a set of the user data 311 and the CRC code 312). The cache directory 33 is stored for every LV.

A cache directory 33 is provided with the following information for every LBA (Logical Block Address):
(*) a cache address 311 that indicates an address of a cache area that is corresponded to an LBA; and
(*) a clean/dirty flag 332 that is a flag that indicates whether data in a user data area cache area that is corresponded to an LBA is the clean data or the dirty data.

In the case in which data that has been stored into a cache area is also stored into the drive 93, the clean/dirty flag 332 for the cache area is 0. On the other hand, in the case in which data that has been stored into a cache area is not stored into the drive 93, the clean/dirty flag 332 for the cache area is 1.

The following items are found in the example shown in FIG. 2 for instance:
(1) Data in an LV area in which an LBA is 00 is stored into a cache area in which an address is 0x4d5b.
(2) Since the clean/dirty flag 332 is 1, data in an LV area in which an LBA is 00 is also stored into the drive 93.

A cache area is each of areas that configure a cache of a memory area 3. A cache is equivalent to the user data area 31 in the present embodiment. Moreover, the information that indicates which cache area is a free cache can be stored into the directory area 20. A free cache area is a cache area that is not allocated to any LBA.

An LV area is each of areas that configure an LV.

A snapshot bitmap 34 is stored into the bitmap area 40. One bit of the snapshot bitmap 34 is corresponded to one LBA.

The snapshot bitmap 34 is a management data that is configured to implement a snapshot function that the storage system 1 is provided with. The snapshot bitmap 34 is created for every LV. The snapshot function is a function for duplicating a volume at a certain point of time and a function for storing data that has been modified from a point of time when a duplicate is executed for the last time and for duplicating only a part that has been modified to speed up a synchronization of data.

The snapshot bitmap 34 indicates whether data in an LV area has been updated or not for every LV area. In the state shown in FIG. 2 for instance, a bit line of the first line indicates that data in which an LBA is 06 and 09 in two LV areas has been updated. The snapshot bitmap 34 is updated in a unit of 1 bit. Since the snapshot bitmap 34 is sufficiently smaller than a unit of read/write of data to the user data area 31, a code that is configured to obtain a reliability assurance is not added to the snapshot bitmap 34.

Figure 3A:
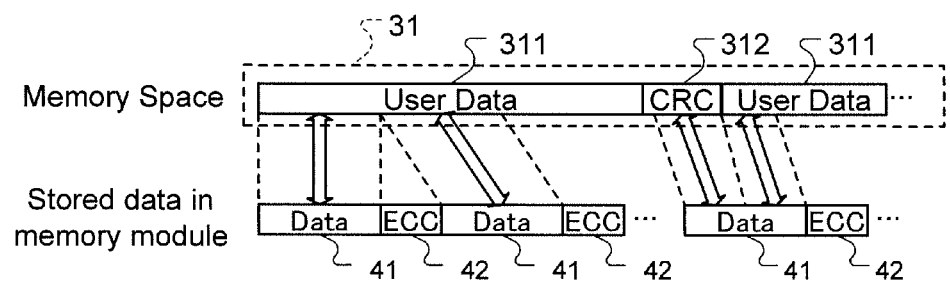
FIG. 3A is a view showing an example of a storing method of a user data to which a CRC (Cyclic Redundancy Check) code has been added in a memory module.
Figure 3B:
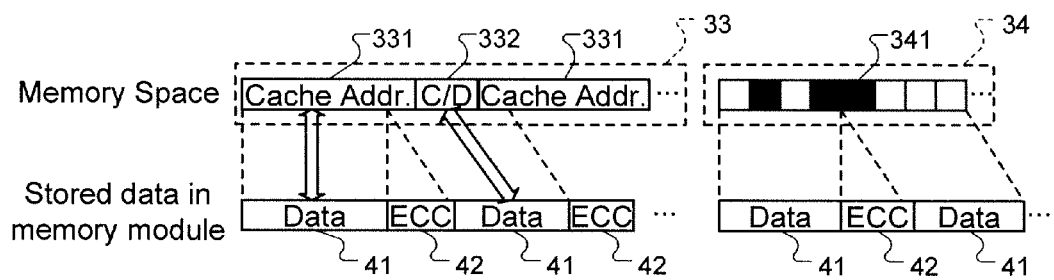
FIG. 3B is a view showing an example of a storing method for a memory module of a cache directory.

FIG. 3A is a view showing an example of a storing method of a user data 311 to which a CRC code has been added in a memory module 2. FIG. 3B is a view showing an example of a storing method of a cache address 321 to which a clean/dirty flag 332 has been added in a memory module 2.

The data in the memory area 3 is stored into the memory module 2 in a practical sense. More specifically, the data in the memory area 3 is divided into data 41 having a certain length (hereafter referred to as the DRAM storage data), an ECC (Error Correction Code) 42 is added to each of the DRAM storage data 41, and a set of the DRAM storage data 41 and the ECC 42 is stored into the memory module 2. In general, an ECC 42 of 8 bytes is added to the DRAM storage data 41 of 64 bytes. In the case in which data is read or written, the DRAM storage data 41 and the ECC 42 are collated with each other.

An error within the certain bits of the DRAM storage data 41 that is corresponded to the ECC 42 can be corrected by using the ECC 42. Moreover, an error within the certain bits of the DRAM storage data 41 that is corresponded to the ECC 42 can be detected by using the ECC 42. In the case in which an error that exceeds this number of bits occurs, there is a possibility that the data is mis-corrected.

In other words, in accordance with a general coding method, in the case in which the ECC 42 of 8 bytes is added to the DRAM storage data 41 of 64 bytes, an error of up to 32 bits of the data can be corrected. Moreover, an error of up to 64 bits of the DRAM storage data 41 can be detected. In the case in which an error that exceeds 64 bits occurs, there is a possibility that the data is mis-corrected.

FIG. 3A is a view showing an example of a storing method of a user data to which a CRC (Cyclic Redundancy Check) code has been added in a memory module. In the case in which the user data 311 to which the CRC code 312 has been added is stored into the memory module 2, the user data 311 is divided into a plurality of DRAM storage data 41 of 64 bytes, the ECC 42 of 8 bytes is added to each of the plurality of DRAM storage data 41, and the DRAM storage data 41 is stored. Since the CRC code 312 has been added to the user data 311 separately from the ECC 42, a reliability assurance is achieved in a double manner.

FIG. 3B is a view showing an example of a storing method for a memory module of a cache directory. In the case in which a cache address 311 and a clean/dirty flag 332 that is corresponded to each LBA is stored into the memory module 2, the cache address 311 and the clean/dirty flag 332 are divided into DRAM storage data 41 of 64 bytes, the ECC 42 of 8 bytes is added to each of the DRAM storage data 41, and the DRAM storage data 41 is stored.

Figure 4:
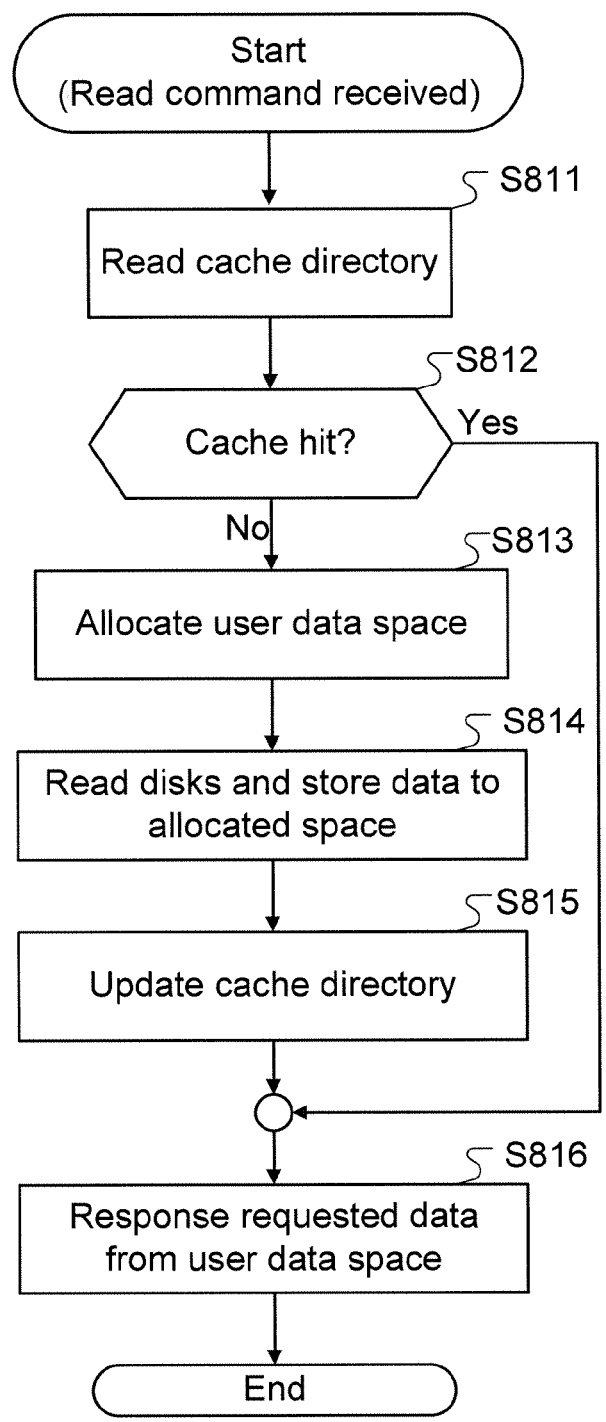
FIG. 4 is a flowchart showing an example of a processing that is executed in the case in which a storage controller 11 receives a read command from a host computer 91.

FIG. 4 is a flowchart showing an example of a processing that is executed in the case in which a storage controller 11 receives a read command from a host computer 91. For the read command, an LV and an LV area of a read source are specified. More specifically, the read command is provided with the LV identification information (such as a LUN (Logical Unit Number)) and an LBA.

In the first place, the storage controller 11 reads the cache directory 33 that is corresponded to an LV of a read source (S811).

In the next place, the storage controller 11 judges whether the user data 311 in an LV area of a read source (hereafter referred to as user data of a read target) exists in the cache area or not based on the cache directory 33 (S812).

In the case in which the result of the judgment of S812 is negative (S812: NO), the storage controller 11 allocates a free cache area as a cache area that is configured to store the user data 311 of a read target (S813).

The storage controller 11 reads the user data 311 of a read target from the drive 93 and transmits the user data 311 to a cache area that has been allocated (S814).

In the next place, the storage controller 11 updates a cache directory 33 that is corresponded to an LV of a read source (S815). More specifically, the storage controller 11 updates a cache address 311 that is corresponded to an LV area (LBA) of a read source.

After that, the storage controller 11 transmits the user data 311 that exists in the allocated cache area to the host computer 91 (S816).

On the other hand, in the case in which the result of the judgment of S812 is positive (S812: YES), the storage controller 11 executes the processing of S816.

Figure 5:
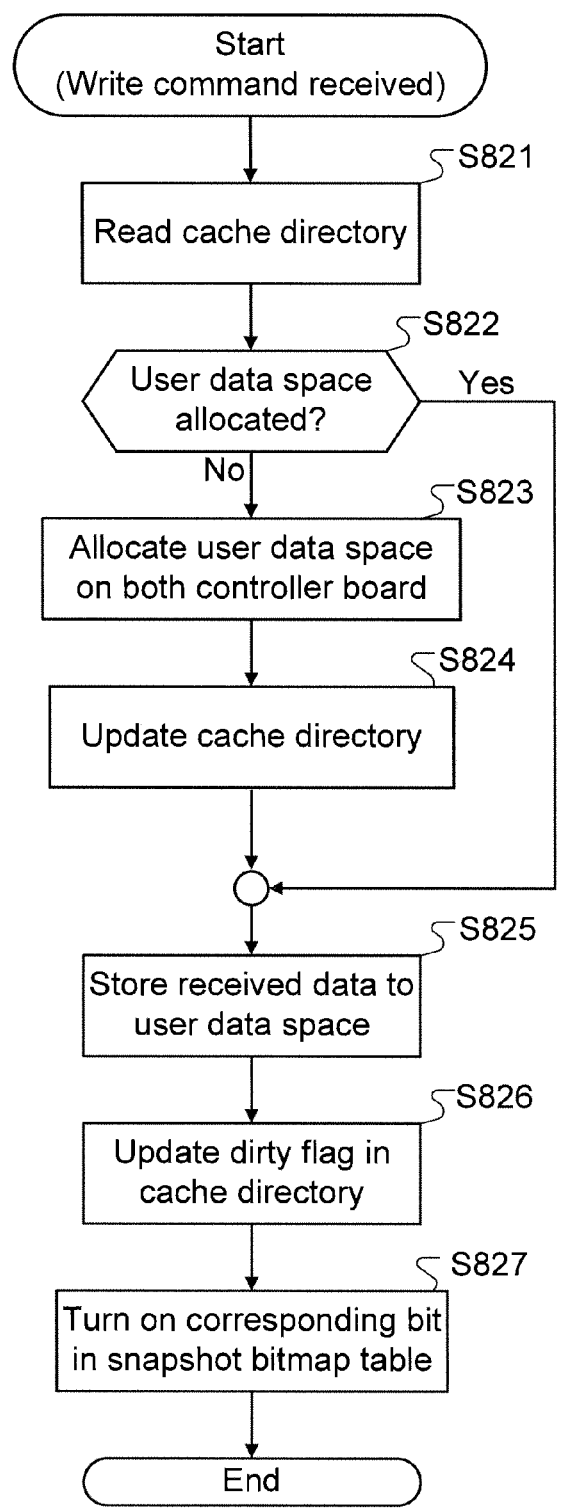
FIG. 5 is a flowchart showing an example of a processing that is executed in the case in which a storage controller 11 receives a write command from a host computer 91.

FIG. 5 is a flowchart showing an example of a processing that is executed in the case in which a storage controller 11 receives a write command from a host computer 91. For the write command, an LV and an LV area (LBA) of a write destination are specified.

In the first place, the storage controller 11 reads the cache directory 33 that is corresponded to an LV of a write destination (S821).

In the next place, the storage controller 11 judges whether the cache area has been allocated for an LV area of a write destination or not based on the cache directory 33 (S822).

In the case in which the result of the judgment of S822 is negative (S822: NO), the storage controller 11 allocates a free cache area as a new cache area that is configured to store the user data 311 that is associated with a write command (hereafter referred to as user data of a write target) (S823).

The storage controller 11 updates a cache directory 33 that is corresponded to an LV of a write destination (S824). More specifically, the storage controller 11 updates a cache address 331 that are corresponded to an LV area (LBA) of a write destination.

On the other hand, in the case in which the result of the judgment of S822 is positive (S822: YES), the storage controller 11 executes the processing of S825 and subsequent processing.

The storage controller 11 stores the user data 311 that has been received from the host computer 91 into the cache area that has been allocated (S825).

The storage controller 11 updates the clean/dirty flag 332 that is corresponded to an LV area (LBA) of a write destination to be "1" (S826).

The storage controller 11 updates a snapshot bitmap 34 that is corresponded to the user data 311 of a write target (S827). More specifically, in the case in which a bit that is corresponded to an LV and an LV area (LBA) of a write destination is "0", the storage controller 11 updates the bit to be 1.

Figure 6:
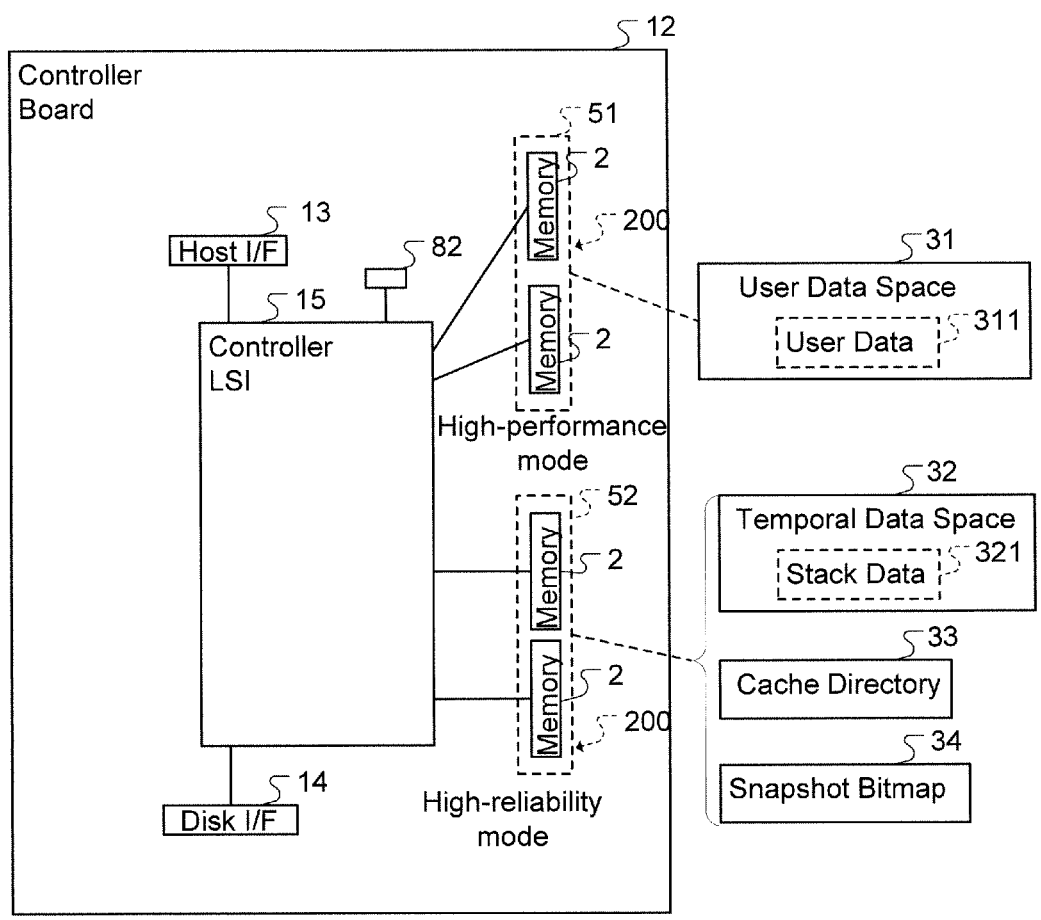
FIG. 6 is a view showing an example of a configuration of a memory module group 200.

FIG. 6 is a view showing an example of a configuration of a memory module group 200.

The memory module group 200 is divided into groups of two types on the controller board 12. One group is an ECC group 51 in a high performance mode, and the other group is an ECC group 52 in a high reliability mode. Here, the ECC group is a unit for reading from or writing to a memory in synchronization.

The ECC group 51 in a high performance mode stores the user data 311. The ECC group 52 in a high reliability mode stores the temporal data 32, a cache directory 33, and a snapshot bitmap 34. Although one ECC group 51 and one ECC group 52 are shown in the figure, the present invention is not restricted to this configuration. The number of ECC groups 51 and ECC groups 52 can also be 2 or more. Moreover, the ECC group 51 in a high performance mode and the ECC group 52 in a high reliability mode can also be coupled on the same memory channel.

Hereafter, the ECC group 51 in a high performance mode is referred to as a high performance ECC group 51, and each of the memory modules 2 that configure the high performance ECC group 51 is referred to as a high performance memory module 2. Moreover, the ECC group 52 in a high reliability mode is referred to as a high reliability ECC group 52, and each of the memory modules 2 that configure the high reliability ECC group 52 is referred to as a high reliability memory module 2. Furthermore, in the case in which the high performance memory module 2 and the high reliability memory module 2 are not distinguished in particular, the high performance memory module 2 and the high reliability memory module 2 are simply referred to as a memory module 2.

Figure 7:
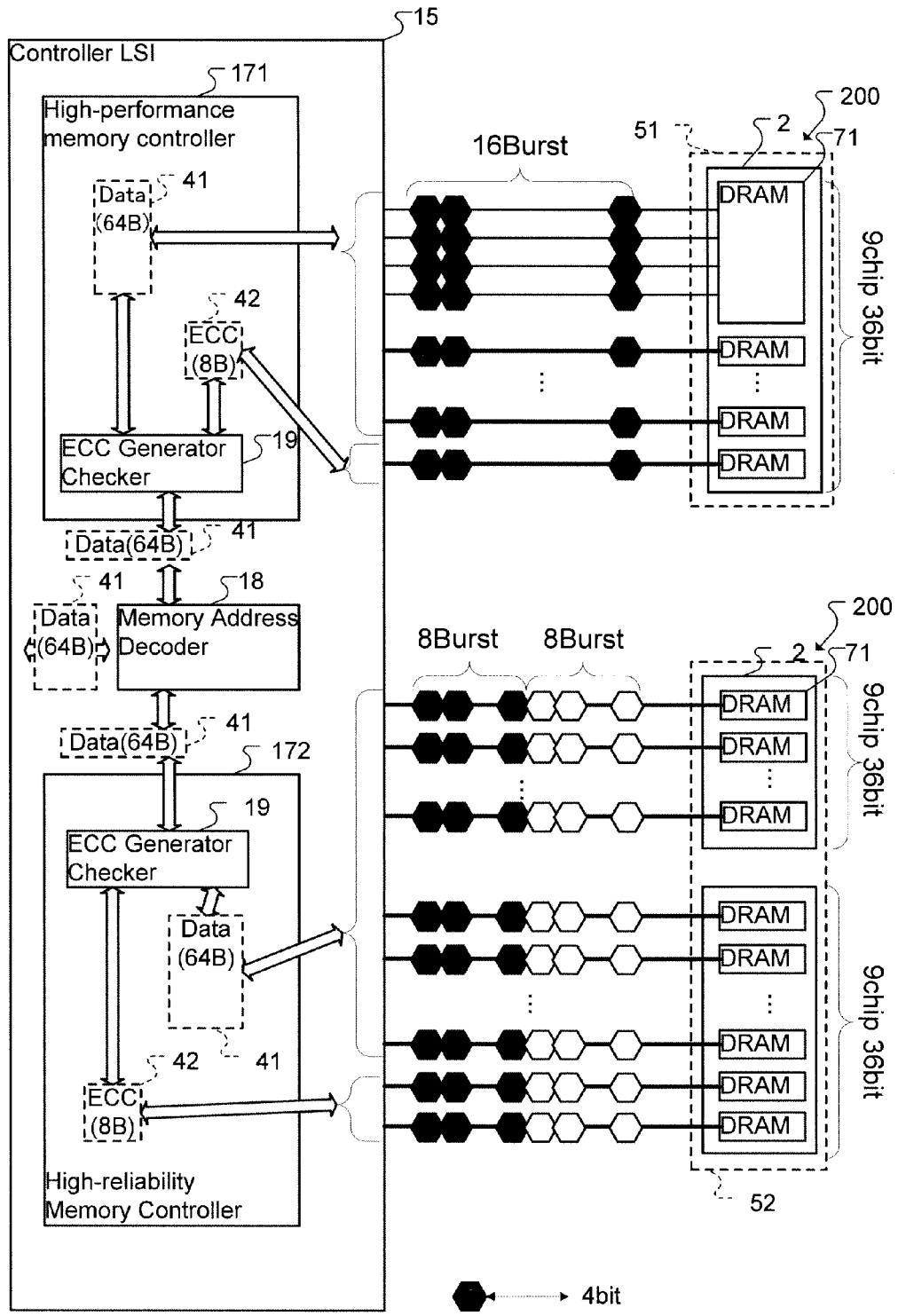
FIG. 7 is a view showing an example of a read/write control of data to a memory module group 200.

FIG. 7 is a view showing an example of a read/write control of data to a memory module group 200.

The controller LSI 15 for the first embodiment is provided with two types of controllers, which are a high performance mode memory controller (hereafter referred to as a high performance controller) 171 and a high reliability mode memory controller (hereafter referred to as a high reliability controller) 172. The high performance ECC group 51 is controlled by the high performance controller 171, and the high reliability ECC group 52 is controlled by the high reliability controller 172.

The high performance controller 171 and the high reliability controller 172 are provided with an ECC generation/check function 19. Moreover, the high performance controller 171 and the high reliability controller 172 share a memory address decoder 18. By the memory address decoder 18, the DRAM storage data 41 is allocated to the high performance controller 171 or the high reliability controller 172. The ECC generation/check function 19 can be implemented by a hardware circuit, or can be implemented by an execution of a computer program by a processor.

Each of the memory modules 2 is provided with a plurality of DRAM chips 71 of the same type. The DRAM chip 71 is a chip in which a maximum signal width is 4 bits and a maximum read/write unit (a maximum burst transfer length) is 16 cycles.

For the high performance ECC group 51, a storage control program configures the DRAM chip 71 as follows:
(*) a read/write unit of a signal is 16 cycles of the maximum.
By the above configuration, for each of the high performance memory modules 2, a signal width and a read/write unit can be used without a waste and the sufficient performance can be achieved.

For the high performance memory module 2, nine DRAM chips 71 that are provided with the above configuration are used. Consequently, the high performance memory module 2 can execute a transmission of the total 72 bytes by executing a 16 cycle transmission of data of 36 bits width.

The memory address decoder 18 allocates data in which a CRC code 312 has been added to the user data 311 (hereafter referred to as the CRC user data 311) to the high performance controller 171. Since the CRC user data 311 is the data of a large size, the CRC user data 311 takes over a large ratio of a memory area 3 and a performance of a read/write is required. Consequently, it is necessary that the DRAM chip 71 is configured as described above.

The high performance controller 171 generates an ECC 42 of 8 bytes from the DRAM storage data 41 of 64 bytes, and makes data of 64 bytes to be corresponded to eight chips of the nine DRAM chips 71 and the ECC data of 8 bytes to be corresponded to one chip of the nine DRAM chips 71 to execute a read or a write.

In the case in which an error occurs in one DRAM chip 71, a read or a write of the maximum 8 bytes may be disabled in some cases. In this case, a correction by an ECC is impossible due to one chip error in some cases. Moreover, in the case in which a use (a read/write) of the high performance memory module 2 in which one point error (an error of 4 bytes or less) that can be corrected has occurred is continued (that is, the high performance memory module 2 is being managed as a memory module that can be used), when one point error occurs in the high performance memory module 2 furthermore (that is, the high performance memory module 2 is provided with two point errors), there is a possibility that data of bytes other than the total 8 bytes cannot be accessed. In this case, a mis-correction may occur in some cases.

For the high reliability ECC group 52, the DRAM chip 71 is configured as follows:
(*) a read/write unit of a signal is 8 cycles.
By the above configuration, since the actual data is transmitted or received in 8 cycles of 16 cycles of a burst transfer length and the other 8 cycles is let go to waste, the sufficient performance cannot be achieved. However, even in the case in which an error occurs in one chip of the DRAM chips 71, the error is for up to 4 bytes and a correction by an ECC can be executed in a certain manner even for one chip error.

The high reliability memory module 2 uses eighteen DRAM chips 72 that are provided with the above configuration. Consequently, the high reliability memory module 2 can execute a transmission of the total 72 bytes by executing an 8 cycle transmission of data of 72 bits width.

The memory address decoder 18 allocates the stack data 321, the cache directory 33, and the snapshot bitmap 34 to the high reliability controller 172. Each of the entries (for instance, a cache address 311 and a clean/dirty flag 312) of the stack data 321, the cache directory 33, and the snapshot bitmap 34 is sufficiently smaller than a read/write unit of the CRC user data 311. Consequently, a performance of a read/write is not required so much. Therefore, even in the case in which a storage control program configures the DRAM chip 71 as described above, a performance of the entire system is not degraded.

The high reliability controller 172 is also provided with an ECC generation/check function 19 for adding and checking an ECC of 8 bytes to the data of 64 bytes. The high reliability controller 172 makes data of 64 bytes to be corresponded to sixteen chips of the eighteen DRAM chips 71, and makes the ECC data of 8 bytes to be corresponded to two chips of the eighteen DRAM chips 71 to execute a read or a write. By the above configuration, even in the case in which an error (an error of 8 bytes or less) furthermore occurs in the high reliability memory module 2 in which one point error (an error of 4 bytes or less) has occurred, an error detecting can be executed, whereby a mis-correction does not occur.

The first embodiment describes the case in which a burst transfer length is 8 bits or 16 bits, a signal width is 4 bits, 36 bits per the memory module 2, and a read/write unit is 64 bytes. However, in the case in which a burst transfer length X of the DRAM chip 71 that configures the high reliability memory module 2 (hereafter referred to as a high reliability DRAM chip) is set to be shorter than a burst transfer length Y of the DRAM chip 71 that configures the high performance memory module 2 (hereafter referred to as a high performance DRAM chip) (for instance, X=Y/a (a is a natural number for instance)) and a bit width P of the high reliability ECC group 52 is set to be larger than a bit width Q of the high performance ECC group 52 (for instance, P=Q×Y/X), it is expected that the similar advantageous effect can be obtained.

Figure 8A:
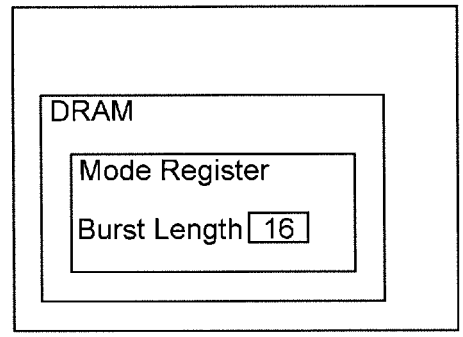
FIG. 8A is a view showing an example of an internal register that is included in a high performance DRAM (Dynamic Random Access Memory) chip.

FIG. 8A is a view showing an example of a status of a mode register 72 that is included in a high performance DRAM chip 71. For the high performance DRAM chip 71, the burst transfer length 73 is configured to be 16.

Figure 8B:
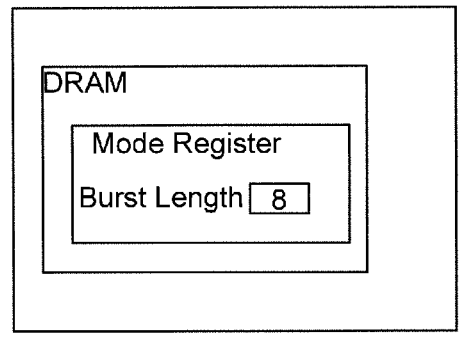
FIG. 8B is a view showing an example of an internal register that is included in a high reliability DRAM chip.

FIG. 8B is a view showing an example of a status of a mode register 72 that is included in a high reliability DRAM chip 71. For the high reliability DRAM chip 71, the burst transfer length 73 is configured to be 8. The register configuration is executed by the storage control program when the storage system 1 is started up.

Figure 9:
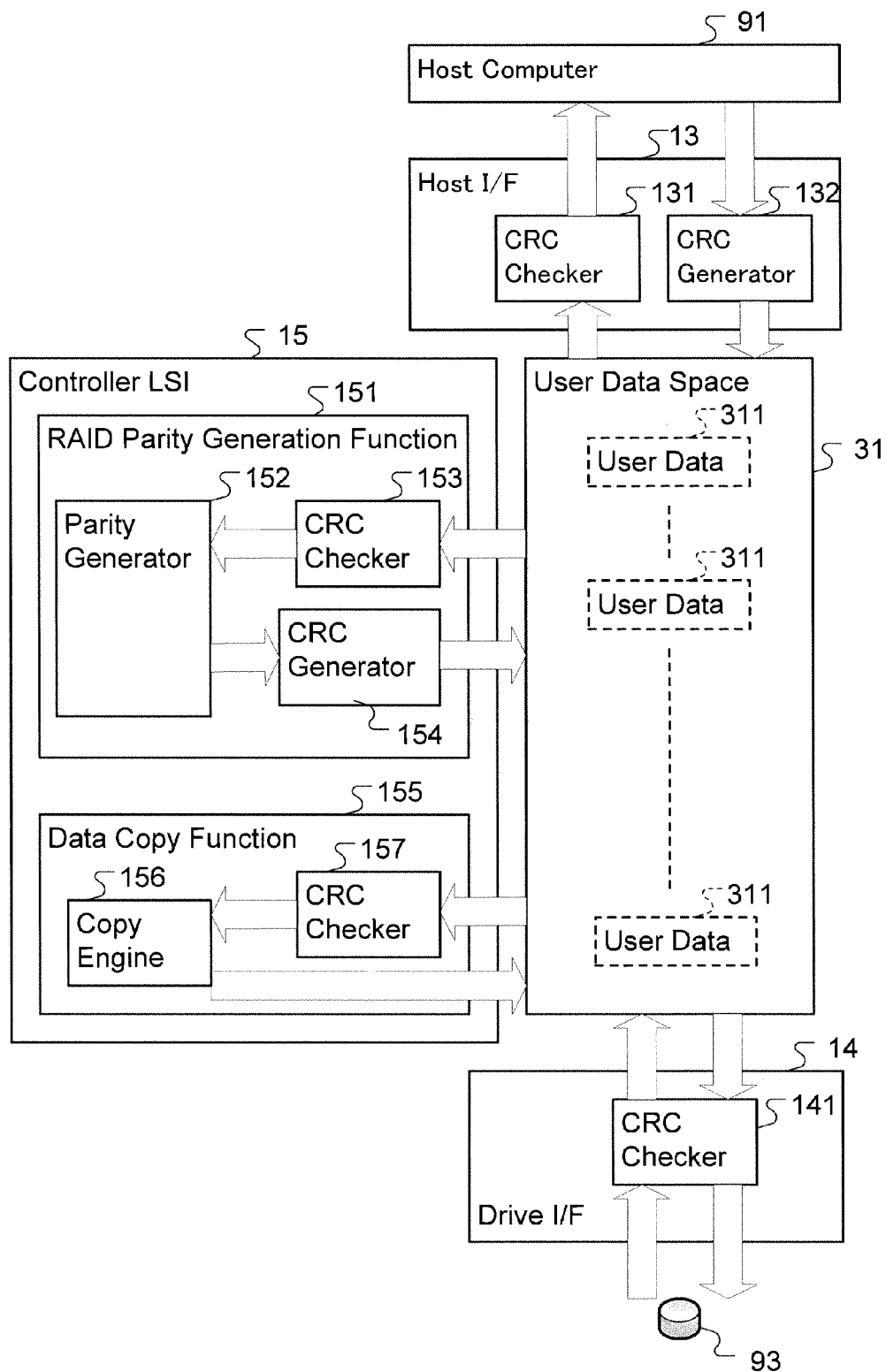
FIG. 9 is a view showing an example of a method for a CRC generation and a CRC check.

FIG. 9 is a view showing an example of a method for a CRC generation and a CRC check. Here, a method of a generation and a CRC check of a CRC code 312 in the case in which the user data 311 is read or written will be described in the following. The CRC code 312 is added to only the user data 311.

The host interface 13 is provided with a CRC check function 131 and a CRC generation function 132. The CRC generation function 132 generates a CRC code 312 to the user data 311 and adds the generated CRC code 312 to the user data 311. The CRC check function 131 checks the user data 311 by using the CRC code 312 that has been read from a drive and the user data 311 that has been added. In the case in which there is no error as a result of the check, the host interface 13 transmits the user data 311 to the host computer 91. In the case in which there is an error as a result of the check, the host interface 13 notifies the processor 16 of an error.

The drive interface 14 is provided with a CRC check function 141. The CRC check function 141 checks the user data 311 by using the user data 311 that has been read from a drive 93 and the CRC code 312 that has been added. In the case in which there is no error as a result of the check, the drive interface 14 reads the user data 311 into a cache area. In the case in which there is an error as a result of the check, the drive interface 14 notifies the processor 16 of an error. Moreover, the CRC check function 141 checks the user data 311 by using the user data 311 that has been read from a cache area and the CRC code 312 that has been added. In the case in which there is no error as a result of the check, the drive interface 14 transmits the user data 311 to the drive 93. In the case in which there is a error as a result of the check, the drive interface 14 notifies the processor 16 of an error.

A RAID parity generation function 151 is provided with a CRC check function 153 and a CRC generation function 154.

The CRC check function 153 checks the user data 311 by using the user data 311 that has been read from a cache area and the CRC code 312 that has been added. In the case in which there is no error as a result of the check, the CRC check function 153 transmits the user data 311 to a parity generator 152. In the case in which there is an error as a result of the check, the RAID parity generation function 151 notifies the processor 16 of an error. Moreover, in the case in which the RAID parity generation function 151 writes the generated RAID parity to the cache area, the RAID parity generation function 151 generates the CRC code 312 that is corresponded to the user data 311 and writes a set of the user data 311 and the CRC code 312 to the cache area.

A data copy function 155 checks a CRC check function 157. The CRC check function 157 checks the user data 311 by using the user data 311 that has been read from a cache area and the CRC code 312 that has been added. In the case in which there is no error as a result of the check, the CRC check function 157 transmits the user data 311 to a copy engine 156. In the case in which there is an error as a result of the check, the data copy function 155 notifies the processor 16 of an error. After that, the copy engine 156 writes the transmitted user data 311 to another area of the cache area. By the copy engine 156, a copy of the user data 311 is generated in the cache area.

In accordance with the above descriptions, even in the case in which the ECC generation/check function 19 mis-corrects temporarily, it is possible to detect that there is an error in the corresponded user data 311 by using the CRC code 312. Consequently, the user data 311 that can be verified by using the CRC code 312 can be a control target of a high performance controller 171.

The xx function as described above can be implemented by a hardware circuit. A part or a whole of the xx function can be implemented by a processor that executes a program.

Figure 10:
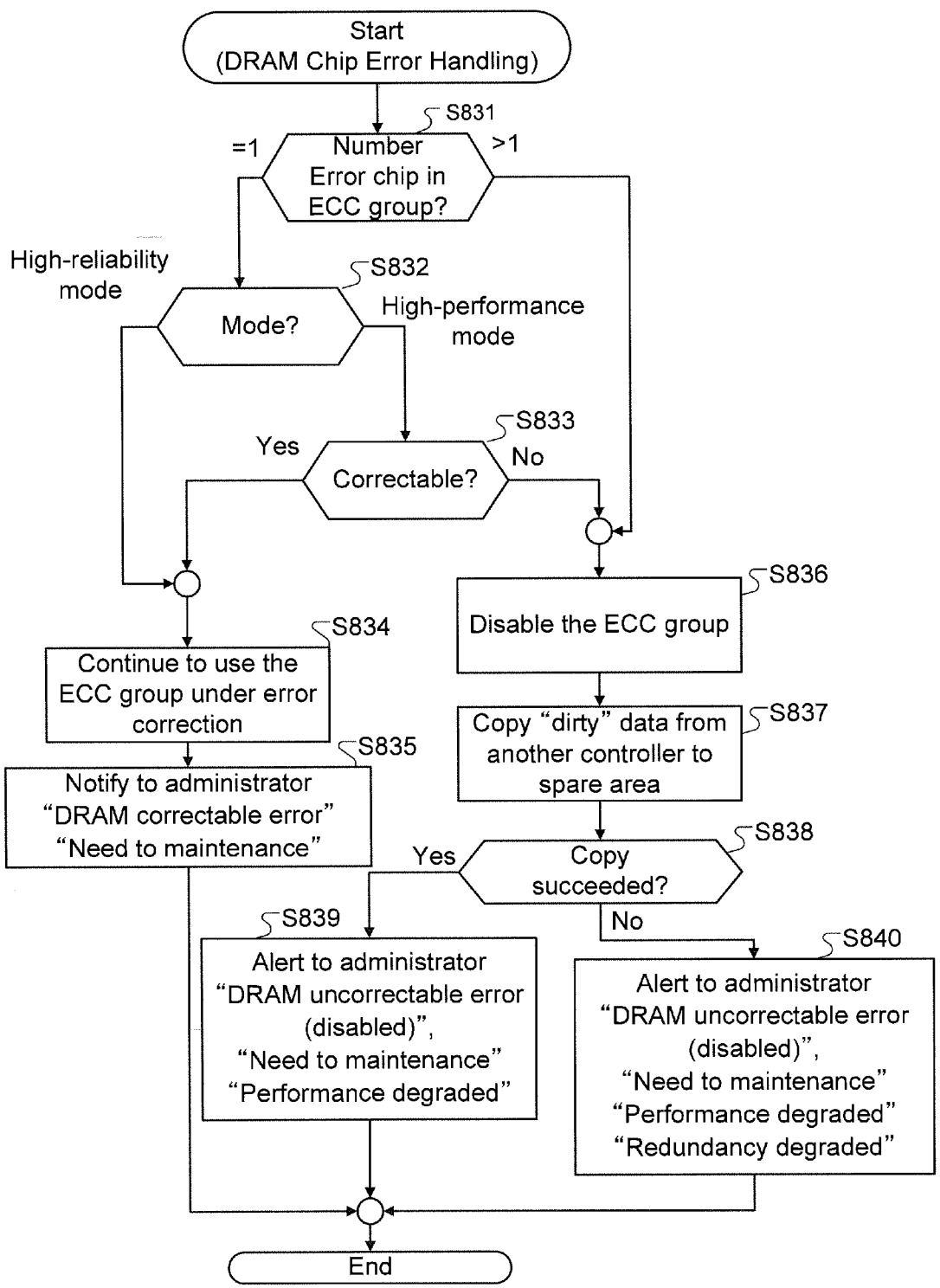
FIG. 10 is a flowchart showing an example of a processing flow that is executed in the case in which an error occurs in a DRAM chip in accordance with a first embodiment of the present invention.

FIG. 10 is a flowchart showing an example of a processing flow that is executed in the case in which an error occurs in a DRAM chip 71 in accordance with a first embodiment of the present invention.

In the case in which the controller LSI 15 detects an error of a DRAM chip 71, the controller LSI 15 checks the number of DRAM chips 71 in which an error has occurred (S831).

In the case in which the number of DRAM chips 71 in which an error has occurred (hereafter referred to as an error chip) is 1, the controller LSI 15 checks whether the error chip 71 belongs to a high performance ECC group 51 or the error chip 71 belongs to a high reliability ECC group 52 (S832).

In the case in which the error chip 71 belongs to the high reliability ECC group 52, since an operation can be continued due to an error correction even for one chip error, the controller LSI 15 executes the steps of S834 and S835.

On the other hand, in the case in which the error chip 71 belongs to the high performance ECC group 51, an error of 8 bytes may occur even for one chip error and an error correction may be impossible in some cases. Consequently, the controller LSI 15 checks whether or not an error correction of the user data 311 is possible (S833).

In the case in which an error correction of the user data 311 is possible, the controller LSI 15 executes the steps of S834 and S835. On the other hand, in the case in which an error correction of the user data 311 is impossible, the controller LSI 15 executes a memory disabling processing in the step of S836 and subsequent steps. In the case in which an error has occurred in two or more DRAM chips 71 in S831, since an error correction of the user data 311 is impossible, the controller LSI 15 executes a memory disabling processing in the step of S836 and subsequent steps.

The steps of S834 and S835 indicate a procedure for executing an operation continuation. The controller LSI 15 continues an operation of an error chip by an error correction (S834). The controller LSI 15 then notifies the management computer 81 of the information that indicates at least one of that an error of a level that can be corrected has occurred in a memory and that a maintenance is needed (S835), and terminates the processing.

The step of S836 and subsequent steps indicate a memory disabling processing. The controller LSI 15 disables the high performance ECC group 51 that is provided with an error chip (S836). In the case in which the user data 311 (for instance, the dirty user data 311) has been stored into the high performance ECC group 51 that has been disabled, the controller LSI 15 copies the user data that is equivalent to the user data 311 from a controller board 12 other than a controller board 12 that is provided with the controller LSI 15 (the other redundant controller board 12) to another cache area of the controller board 12 (a high performance ECC group 51 other than the high performance ECC group that has been disabled) (S837). Since the user data 311 has been stored into a cache of the both controller boards 12, the user data in the disabled high performance ECC group of one controller board 12 can be copied from the high performance ECC group of the other controller board 12 to a high performance ECC group that has not been disabled on one controller board 12 in this case.

In the next place, the controller LSI 15 judges whether or not the copy has been succeeded (S838).

In the case in which the result of the judgment of S838 is positive (S838: Yes), the controller LSI 15 notifies the management computer 81 of the information that indicates at least one of that an error of a level that cannot be corrected has occurred in the high performance memory module 2 and the high performance memory module has been disabled, that a maintenance is needed, and that a performance is degraded (S839), and terminates the processing.

On the other hand, in the case in which the result of the judgment of S838 is negative (S838: NO), the controller LSI 15 notifies the management computer 81 of the information that indicates at least one of that an error of a level that cannot be corrected has occurred in the high performance memory module 2 and the high performance memory module has been disabled, that a maintenance is needed, that a performance is degraded, and that the redundancy of the storage system is degraded (S840), and terminates the processing.

By the above processing, the memory module 2 can be continued to be used to the extent possible depending on a type of an ECC group to which the memory module 2 belongs and a level of an error of the memory module 2. Moreover, a manager who uses the management computer 81 can be notified of the appropriate information.

Figure 11:
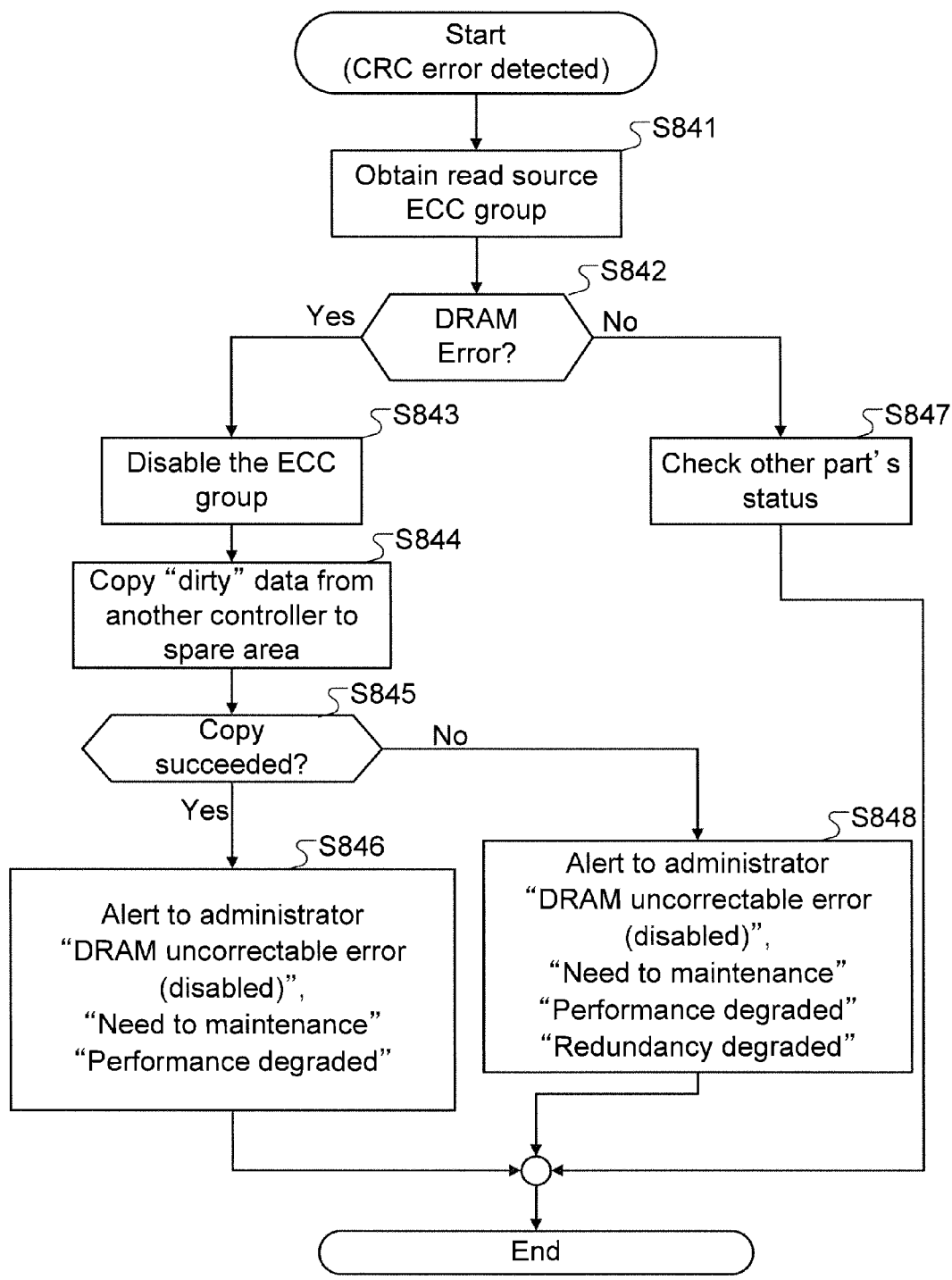
FIG. 11 is a flowchart showing an example of a processing flow that is executed in the case in which a CRC error is detected.

FIG. 11 is a flowchart showing an example of a processing flow that is executed in the case in which a CRC error is detected.

In the case in which the CRC check functions (131, 141, 153, and 157) detect a CRC error, the controller LSI 15 specifies a high performance ECC group 51 that is a read source (S841). This is a processing that is required in the case in which there is a plurality of high performance ECC groups 51.

In the next place, the controller LSI 15 judges whether or not a DRAM error has occurred in the high performance ECC group 51 that has been specified in S841 (S842). In the case in which a DRAM error (an error of the DRAM chip 71) has occurred (S842: Yes), the controller LSI 15 decides that a mis-correction due to the DRAM error is a cause of a CRC error and disables the high performance ECC group 51 (S843).

Since the subsequent steps of S844 to S847 are almost equivalent to the processing (S835 to S839) that is executed by the controller LSI 15 as shown in FIG. 10, the detailed descriptions for the steps are omitted.

On the other hand, in the case in which a DRAM error has not occurred (S842: No), the controller LSI 15 checks a status of other parts since an error has occurred in a part other than the DRAM chip 71 (S847).

By the above processing, even in the case in which one point error furthermore occurs in the DRAM chip 71 in which one point error that can be corrected has occurred and a mis-correction by an ECC has occured for the high performance ECC group 51, the controller LSI 15 can detect that an mis-correction by the CRC code 312. Consequently, an error DRAM chip 71 can be disabled and an operation of the storage system 1 can be continued in a remaining part.

FIG. 12 is a view showing an example of a management screen.

A status of each of the ECC groups 51 and 52 are transmitted to the management computer 81 by the controller LSI 15, and the management computer 81 displays the management screen.

The management screen displays a status (such as OK, Need to maintenance, and Disabled) for each of the ECC groups 51 and 52 for instance. Moreover, the management computer 81 can also display a status of the storage system 1, such as Maintenance Needed, Performance Degraded, Redundancy Degraded, as a whole of the storage system 1 based on the statuses of the ECC groups 51 and 52, which are transmitted from the controller LSI, on the management screen.

In accordance with the first embodiment, the user data 311 that has an influence to a system performance is stored into the high performance ECC group for the storage system 1. Consequently, the user data 311 can be read or written at a high speed. Moreover, in the case in which one point error occurs in a high performance memory module, a use of the high performance memory module is continued. In the case in which one point error furthermore occurs in the high performance memory module, there is a possibility that a mis-correction occurs. In this case, a check based on a CRC code 312 can be executed.

Moreover, the control data that is data that has an influence to the availability and a reliability of an apparatus (the temporal data 32, a cache directory 33, and a snapshot bitmap 34 for the present embodiment) is stored into the high reliability ECC group. Moreover, in the case in which one point error occurs in a high reliability memory module, a use of the high reliability memory module is continued. In the case in which one point error furthermore occurs in the high reliability memory module, the high reliability memory module 2 is disabled. Consequently, a mis-correction can be prevented even in the case in which such an error occurs.

Consequently, in accordance with the first embodiment, it is possible that a performance, a reliability, and availability for the storage system 1 are improved.

For the first embodiment, the high performance ECC group is an ECC group that is provided with a performance higher than that of the high reliability ECC group, and the high reliability ECC group is an ECC group that is provided with the reliability higher than that of the high performance ECC group.

EMBODIMENT 2

In accordance with the present embodiment, while the performance of the storage system 1 is maintained, and the reliability and the availability of the storage system 1 can be achieved at the same time. For the present embodiment, a difference from the first embodiment will be described below in detail with reference to the drawings.

Figure 13:
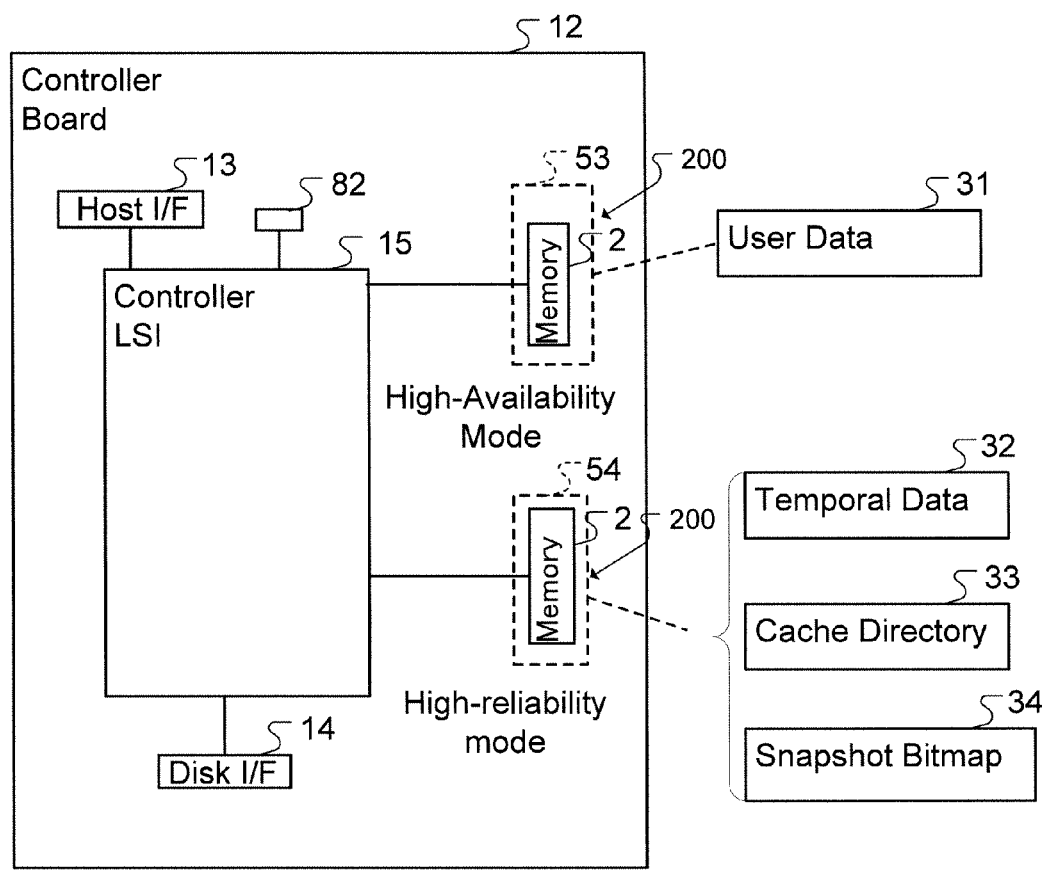
FIG. 13 is a view showing an example of a configuration of a memory module group 200 in accordance with a second embodiment of the present invention.

FIG. 13 is a view showing an example of a configuration of a memory module group 200 in accordance with a second embodiment of the present invention.

For the present embodiment, the memory module group 200 is also divided into groups of two types on the controller board 12. One group is an ECC group 53 in a high availability mode (hereafter referred to as a high availability ECC group), and the other group is an ECC group 54 in a high reliability mode (hereafter referred to as a high reliability ECC group). The high availability ECC group 53 stores the user data 311. The high reliability ECC group 54 stores the control data (such as the temporal data 32, a cache directory 33, and a snapshot bitmap 34). Although one ECC group 53 and one ECC group 54 are shown in the figure, the present invention is not restricted to this configuration. The number of ECC groups 53 and ECC groups 54 can also be 2 or more. Moreover, the ECC group 53 in a high availability mode and the ECC group 54 in a high reliability mode can also be coupled on the same memory channel.

Hereafter, a memory module 2 that configures the high availability ECC group 53 is referred to as a high availability memory module 2, and a memory module 2 that configures the high reliability ECC group 54 is referred to as a high reliability memory module 2. Furthermore, in the case in which the high availability memory module 2 and the high reliability memory module 2 are not distinguished in particular, the high availability memory module 2 and the high reliability memory module 2 are simply referred to as a memory module 2.

Figure 14:
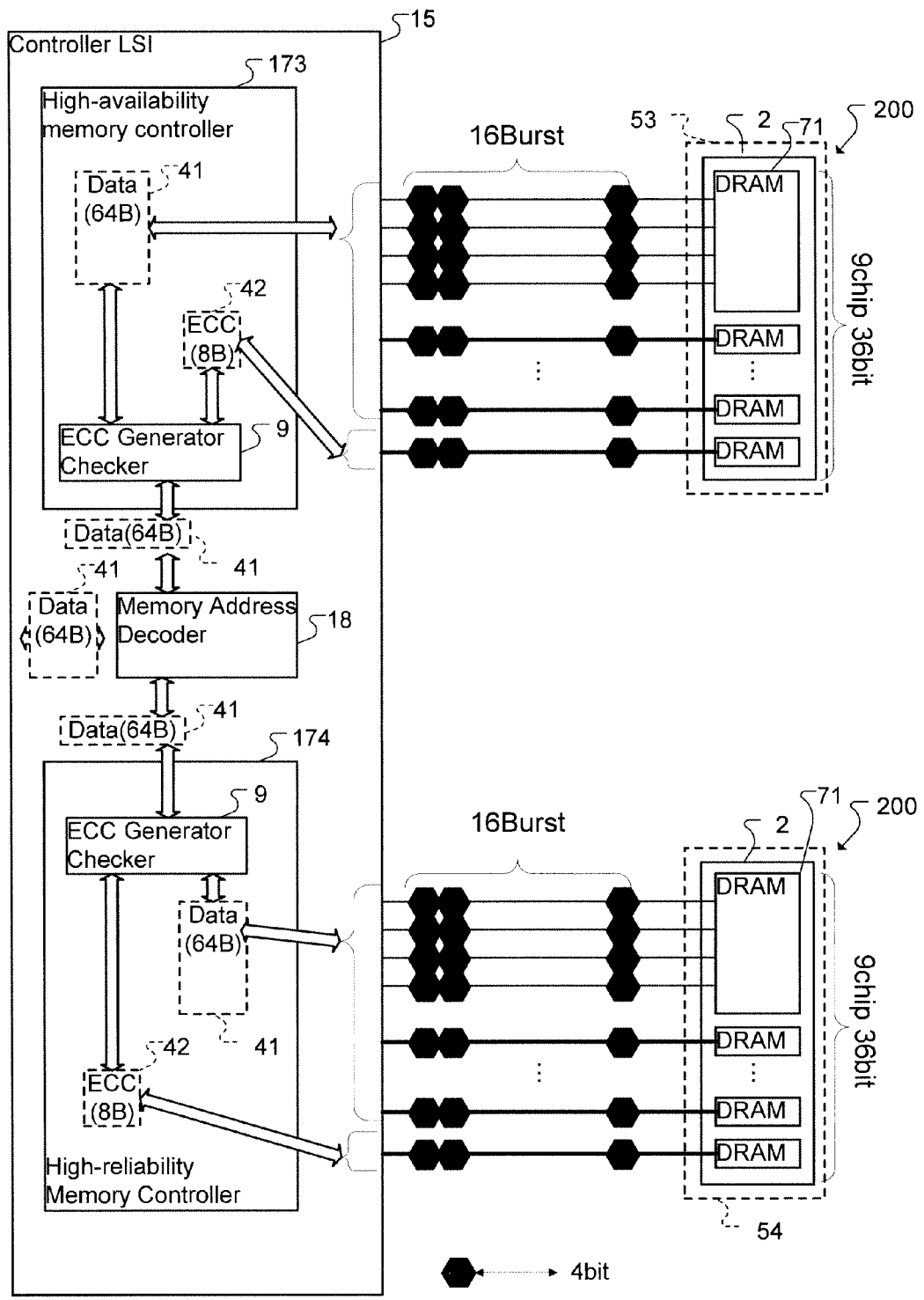
FIG. 14 is a view showing an example of a read/write control of data to a memory module group 200 in accordance with a second embodiment of the present invention.

FIG. 14 is a view showing an example of a read/write control of data to a memory module group 200 in accordance with the second embodiment of the present invention.

The controller LSI 15 for the second embodiment is provided with two types of controllers, which are a high availability mode memory controller (hereafter referred to as a high availability controller) 173 and a high reliability mode memory controller (hereafter referred to as a high reliability controller) 174. The high availability ECC group 53 is controlled by the high availability controller 173, and the high reliability ECC group 54 is controlled by the high reliability controller 174.

The high availability controller 173 and the high reliability controller 174 are provided with an ECC generation/check function 19. Moreover, the high availability controller 173 and the high reliability controller 174 share a memory address decoder 18. By the memory address decoder 18, the DRAM storage data 41 is allocated to the high availability controller 173 or the high reliability controller 174.

Similarly to the DRAM chip 71 that belongs to the high performance ECC group for the first embodiment, a storage control program configures the DRAM chip 71 that belongs to each of the ECC groups 53 and 54 as follows:
(*) a read/write unit of a signal is 16 cycles of the maximum.
By the above configuration, for each of the memory modules 2 that belong to the ECC groups 53 and 54, a signal width and a read/write unit can be used without a waste and the sufficient performance can be achieved.

For each of the memory modules 2 that configure each of the ECC groups 53 and 54, nine DRAM chips 71 that are provided with the above configuration are used. Consequently, the high reliability memory module 2 can execute a transmission of the total 72 bytes by executing an 8 cycle transmission of data of 72 bits width.

Each of the controllers 173 and 174 generates an ECC 42 of 8 bytes from the DRAM storage data 41 of 64 bytes, and makes data of 64 bytes to be corresponded to eight chips of the nine DRAM chips 71 and the ECC data of 8 bytes to be corresponded to one chip of the nine DRAM chips 71 to execute a read or a write.

However, in the case in which the DRAM chip 71 is configured as described above and one point error occurs in one DRAM chip 71, a read or a write of 8 bytes may be corrupted in some cases. In other words, a correction by an ECC is impossible due to one chip error in some cases. Moreover, in the case in which one point error (an error of 4 bytes or less) that can be corrected has occurred and a use (a read/write) of the memory module 2 in which the one point error has occurred is continued, when one point error occurs in the memory module 2 furthermore, there is a possibility that data of bytes other than the total 8 bytes cannot be accessed. In this case, a mis-correction may occur in some cases.

Figure 15:
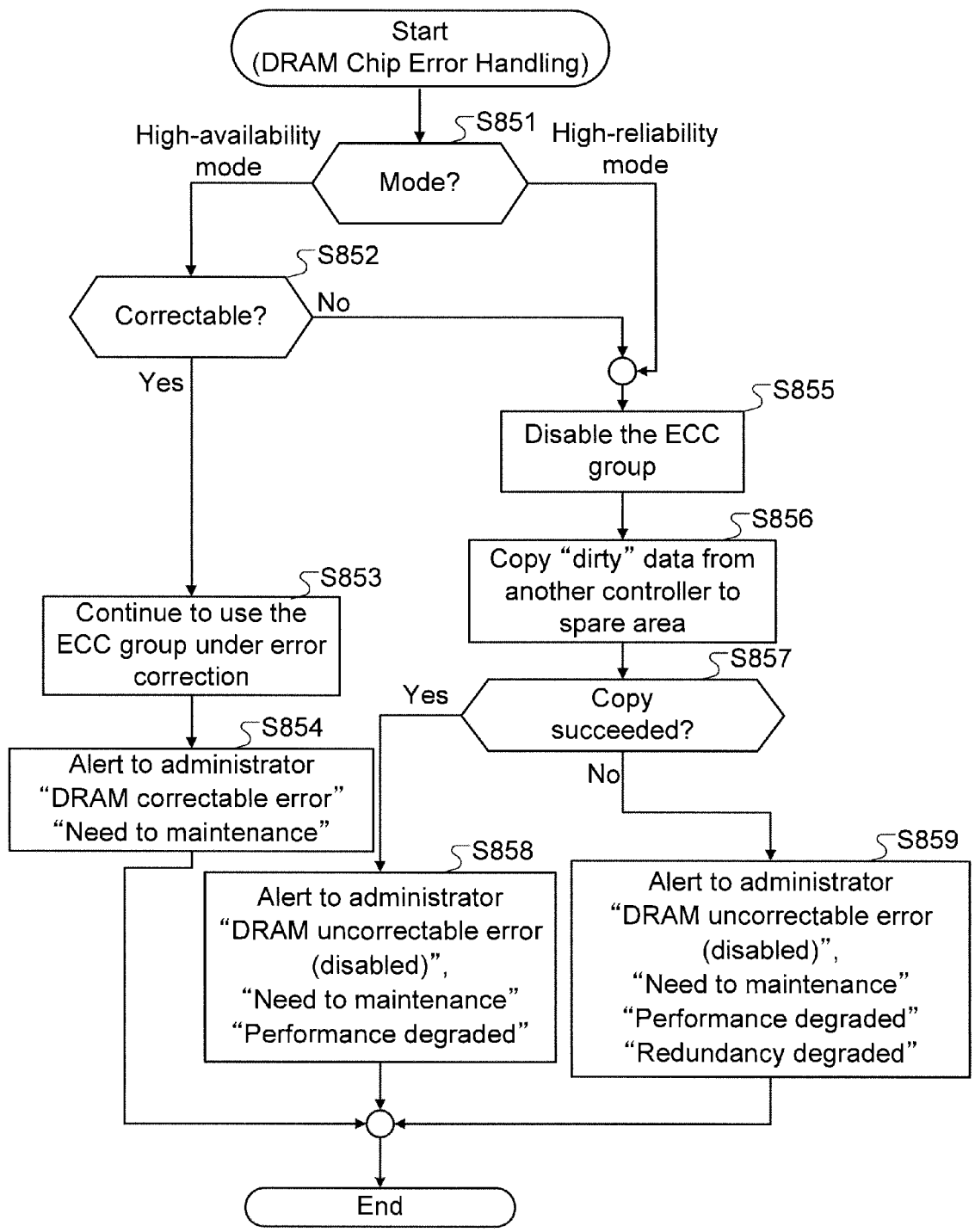
FIG. 15 is a flowchart showing an example of a processing flow that is executed in the case in which an error occurs in a DRAM chip in accordance with a second embodiment of the present invention.

FIG. 15 is a flowchart showing an example of a processing flow that is executed in the case in which an error occurs in a DRAM chip in accordance with a second embodiment of the present invention.

In the case in which the controller LSI 15 detects an error of the DRAM chip 71, the controller LSI 15 checks whether a memory module 2 in which an error has occurred is a memory module 2 that belongs to a high availability ECC group 53 or a memory module 2 that belongs to a high reliability ECC group 54 (S851).

In the case in which the memory module 2 in which an error has occurred belongs to a high availability ECC group 53, since it is better that an operation is continued to the extent possible even if there is a risk of an ECC mis-correction, the controller LSI 15 checks whether or not an operation can be still continued by a correction with an ECC (whether or not an error of the data in the memory module 2 can be corrected by an ECC) (S852).

In the case in which the controller LSI 15 decides that an operation can be continued (S852: Yes), the controller LSI 15 continues a use of the memory module 2 in which an error has occurred (S853).

The controller LSI 15 then notifies the management computer 81 of the information that indicates at least one of that an error of a level that can be corrected has occurred in a memory and that a maintenance is needed (S854), and terminates the processing.

On the other hand, in the case in which the memory module 2 in which an error has occurred belongs to the high reliability ECC group 54 (S851), since it is necessary that a risk of a mis-correction is avoided, the controller LSI 15 disables the memory module 2 in which an error has occurred. Moreover, in the case in which an error of the data in the memory module 2 can be corrected by an ECC (S852: No), the controller LSI 15 also disables the memory module 2 in which an error has occurred. The memory module 2 is disabled in the case in which the controller LSI 15 executes the processing of S855 and subsequent processing.

In the case in which the memory module 2 is disabled, the controller LSI 15 disables an ECC group that is provided with the memory module 2 in which an error has occurred in the first place (S855).

In the case in which an error location is an area that has stored the user data 311 (for instance, the dirty user data 311), the controller LSI 15 copies the user data that is equivalent to the user data 311 from the other redundant controller board 15 to another cache area of the controller board 15 that is provided with the controller LSI 15 (the high availability ECC group that has not been disabled) (S856).

In the next place, the controller LSI 15 judges whether or not the copy has been succeeded. In the case in which the copy has been succeeded (S857: Yes), the controller LSI 15 notifies the management computer 81 of the information that indicates at least one of that an error of a level that cannot be corrected has occurred in the memory and the memory has been disabled, that a maintenance is needed, and that a performance is degraded (S858), and terminates the processing.

On the other hand, in the case in which the copy has been failed (S857: No), the controller LSI 15 notifies the management computer 81 of the information that indicates at least one of that an error of a level that cannot be corrected has occurred in the memory and the memory has been disabled, that a maintenance is needed, that a performance is degraded, and that the redundancy of the storage system is degraded (S859), and terminates the processing.

In accordance with the second embodiment, for the user data 311 in which an error detection with a CRC can be executed, even in the case in which a mis-correction caused by two point error (more one point error occurs after one point error occurs) occurs, an error can be detected. Consequently, it is not necessary that a memory module is disabled by one point error, and a use of the memory module can be continued. By the above configuration, it is possible that the availability of the system is improved.

On the other hand, for the control data that is data in which an error detection with a CRC is impossible (for instance, the temporal data 32, a cache directory 33, and a snapshot bitmap 34), in the case in which a mis-correction occurs by two point error, an error detection is impossible. Consequently, by disabling a memory module in the stage in which one point error occurs, a mis-correction in the case in which one point error furthermore occurs can be prevented. By the above configuration, although the availability is degraded, it is possible that the reliability of the system is improved.

Consequently, in accordance with the second embodiment, since data is read or written while a read/write unit of a signal for each of the DRAM chips 71 is specified to be 16 cycles of the maximum, the performance of the storage system 1 can be maintained. Moreover, in accordance with the second embodiment, it is possible that a reliability and availability for the storage system 1 are improved.

For the second embodiment, the high availability ECC group is an ECC group that is provided with the availability higher than that of the high reliability ECC group, and the high reliability ECC group is an ECC group that is provided with the reliability higher than that of the high availability ECC group.

EMBODIMENT 3

In accordance with the present embodiment, while the reliability and the performance of the storage system 1 is maintained, and the availability of the storage system 1 can be achieved at the same time. For the present embodiment, a difference from the first embodiment will be described below in detail with reference to the drawings.

Figure 16:
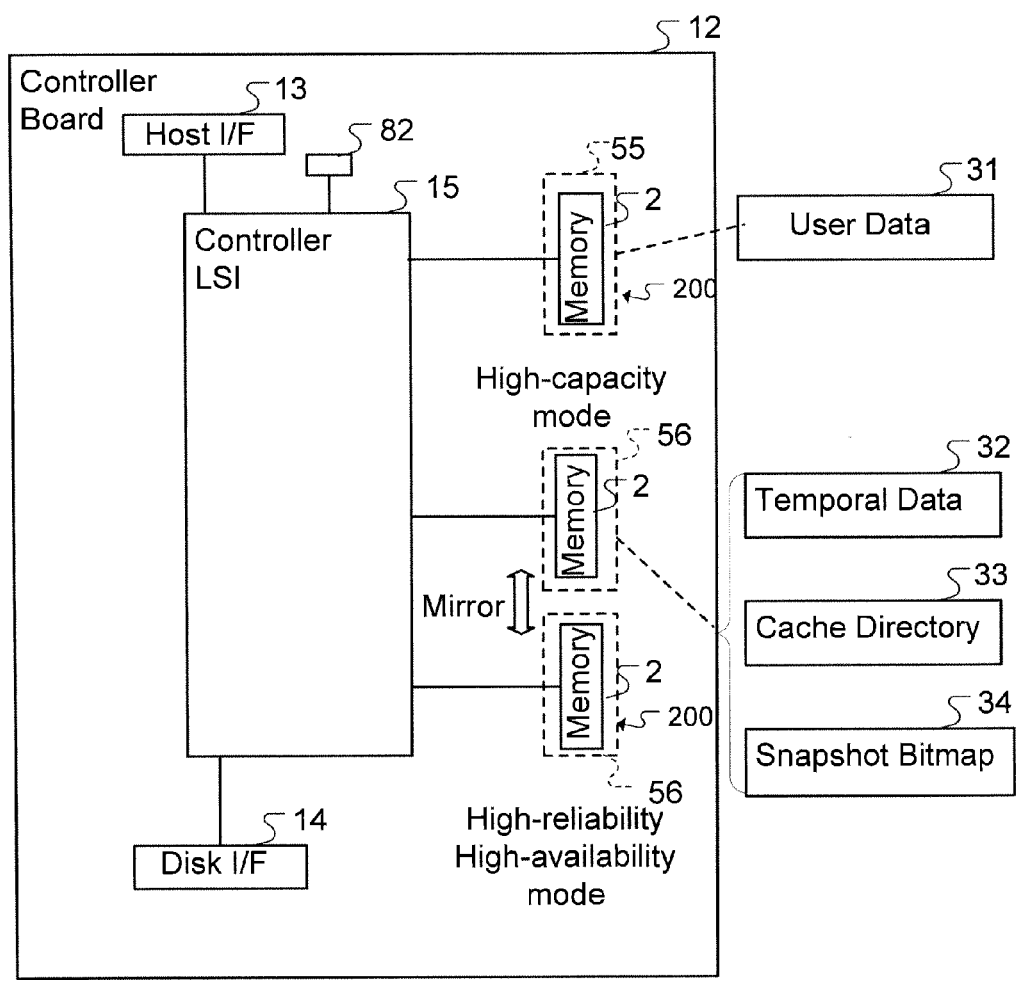
FIG. 16 is a view showing an example of a configuration of a memory module group 200 in accordance with a third embodiment of the present invention.

FIG. 16 is a view showing an example of a configuration of a memory module group 200 in accordance with a third embodiment of the present invention.

For the present embodiment, the memory module group 200 is also divided into groups of two types on the controller board 12. One group is an ECC group 55 in a high capacity mode (hereafter referred to as a high capacity ECC group), and the other group is an ECC group 56 in a high reliability high availability mode (hereafter referred to as a high reliability high availability ECC group). The high capacity ECC group 55 stores the user data 311. The high reliability high availability ECC group 56 stores the control data (such as the temporal data 32, a cache directory 33, and a snapshot bitmap 34). Although one ECC group 55 and one ECC group 56 are shown in the figure, the present invention is not restricted to this configuration. The number of ECC groups 55 and ECC groups 56 can also be 2 or more. Moreover, the ECC group 55 in a high availability mode and the ECC group 56 in a high reliability high availability mode can also be coupled on the same memory channel.

In accordance with the third embodiment, two high reliability high availability ECC groups 56 and 56 are used as one set. The same data is stored into both of the two high reliability high availability ECC groups 56 and 56. By the above configuration, although a capacity that can be used is reduced for the high reliability high availability ECC group 56, even in the case in which one ECC group 56 in which an error has occurred is disabled when an error occurs, the other ECC group 56 in which an error has not occurred can be accessed, whereby it is possible that the availability is improved. In this case, an ECC group 56 in which an error has occurred is disabled for one point error, and a use of the other ECC group 56 in which an error has not occurred is continued, whereby the reliability is covered.

Figure 17:
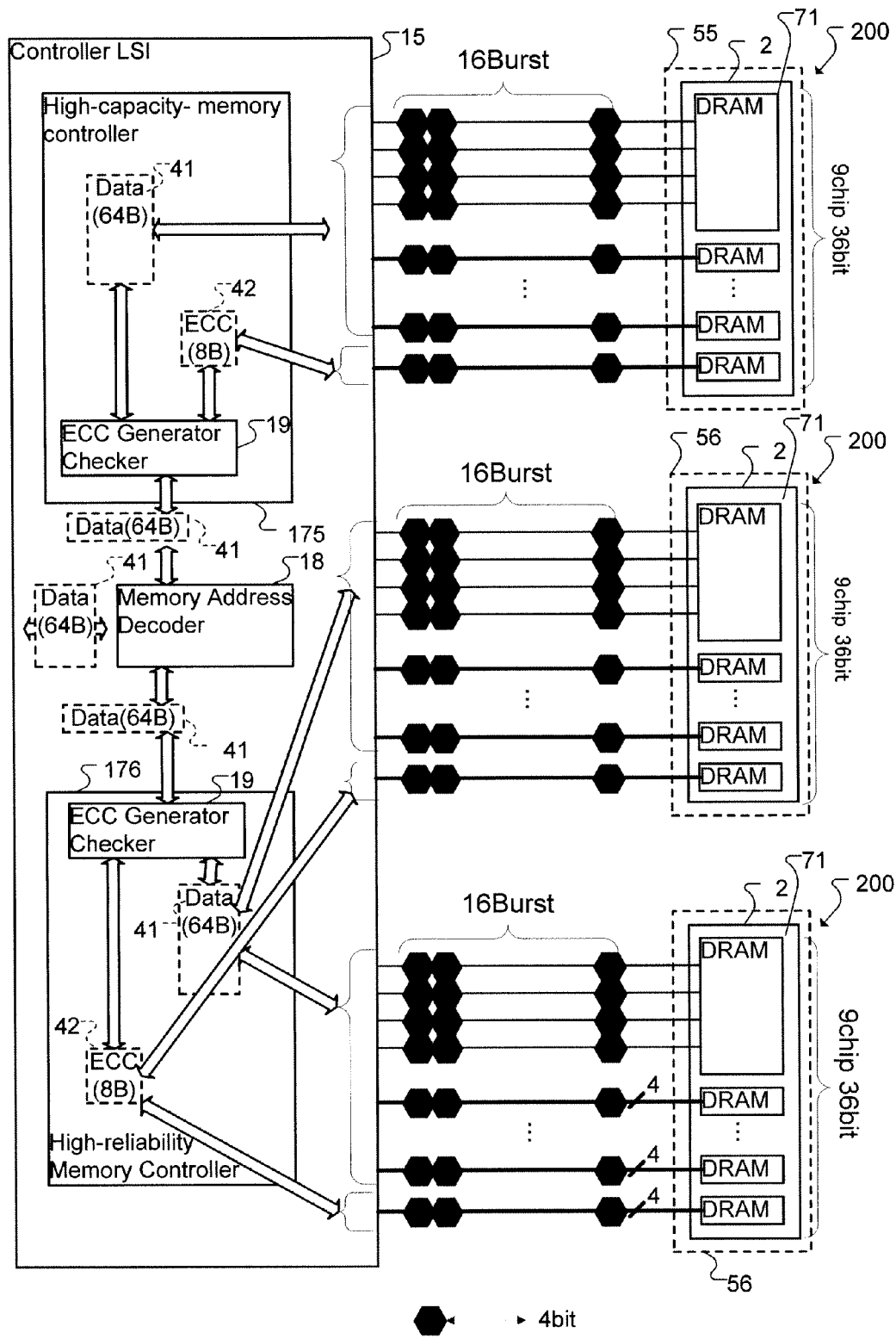
FIG. 17 is a view showing an example of a read/write control of data to a memory module group 200 in accordance with a third embodiment of the present invention.

FIG. 17 is a view showing an example of a read/write control of data to a memory module group 200 in accordance with a third embodiment of the present invention.

The controller LSI 15 for the third embodiment is provided with two types of controllers, which are a high capacity mode memory controller (hereafter referred to as a high capacity controller) 175 and a high reliability high availability mode memory controller (hereafter referred to as a high reliability high availability controller) 176. The high capacity ECC group 55 is controlled by the high capacity controller 175, and the high reliability high availability ECC group 56 is controlled by the high reliability high availability controller 176.

The high capacity controller 175 and the high reliability high availability controller 176 are provided with an ECC generation/check function 19. Moreover, the high capacity controller 175 and the high reliability high availability controller 176 share a memory address decoder 18. By the memory address decoder 18, the DRAM storage data 41 is allocated to the high capacity controller 175 or the high reliability and high availability controllers 176.

Similarly to the DRAM chip 71 that belongs to the high performance ECC group for the first embodiment, a storage control program configures the DRAM chip 71 that belongs to each of the ECC groups 55 and 56 as follows:

(*) a read/write unit of a signal is 16 cycles of the maximum. By the above configuration, for each of the memory modules, a signal width and a read/write unit can be used without a waste and the sufficient performance can be achieved.

For each of the memory modules 2 that configure each of the ECC groups 55 and 56, nine DRAM chips 71 that are provided with the above configuration are used.

Consequently, the high reliability memory module 2 can execute a transmission of the total 72 bytes by executing an 8 cycle transmission of data of 72 bits.

The high capacity controller 175 generates an ECC 42 of 8 bytes from the DRAM storage data 41 of 64 bytes, and makes data of 64 bytes to be corresponded to eight chips of the nine DRAM chips 71 and the ECC data of 8 bytes to be corresponded to one chip of the nine DRAM chips 71 to execute a read or a write.

However, in the case in which the DRAM chip 71 that configures the ECC group 55 is configured as described above and one point error occurs in one DRAM chip 71, a read or a write of 8 bytes may be disabled in some cases. In other words, a correction by an ECC is impossible due to one chip error in some cases. Moreover, in the case in which one point error (an error of 4 bytes or less) that can be corrected has occurred and a use (a read/write) of the memory module 2 in which the one point error has occurred is continued, when one point error occurs in the memory module 2 furthermore, a read/write of data of bytes other than the total 8 bytes may become impossible. In this case, a mis-correction may occur in some cases.

On the other hand, the high reliability high availability controller 176 also generates an ECC 42 of 8 bytes from the DRAM storage data 41 of 64 bytes, and makes data of 64 bytes to be corresponded to eight chips of the nine DRAM chips 71 and the ECC data of 8 bytes to be corresponded to one chip of the nine DRAM chips 71 to execute a read or a write. However, the high reliability high availability controller 176 writes the data that was generated at that time to each of the two memory module groups 200. By this configuration, even in the case in which one ECC group 56 is disabled, the other ECC group 56 can be used to continue an access.

Figure 18:
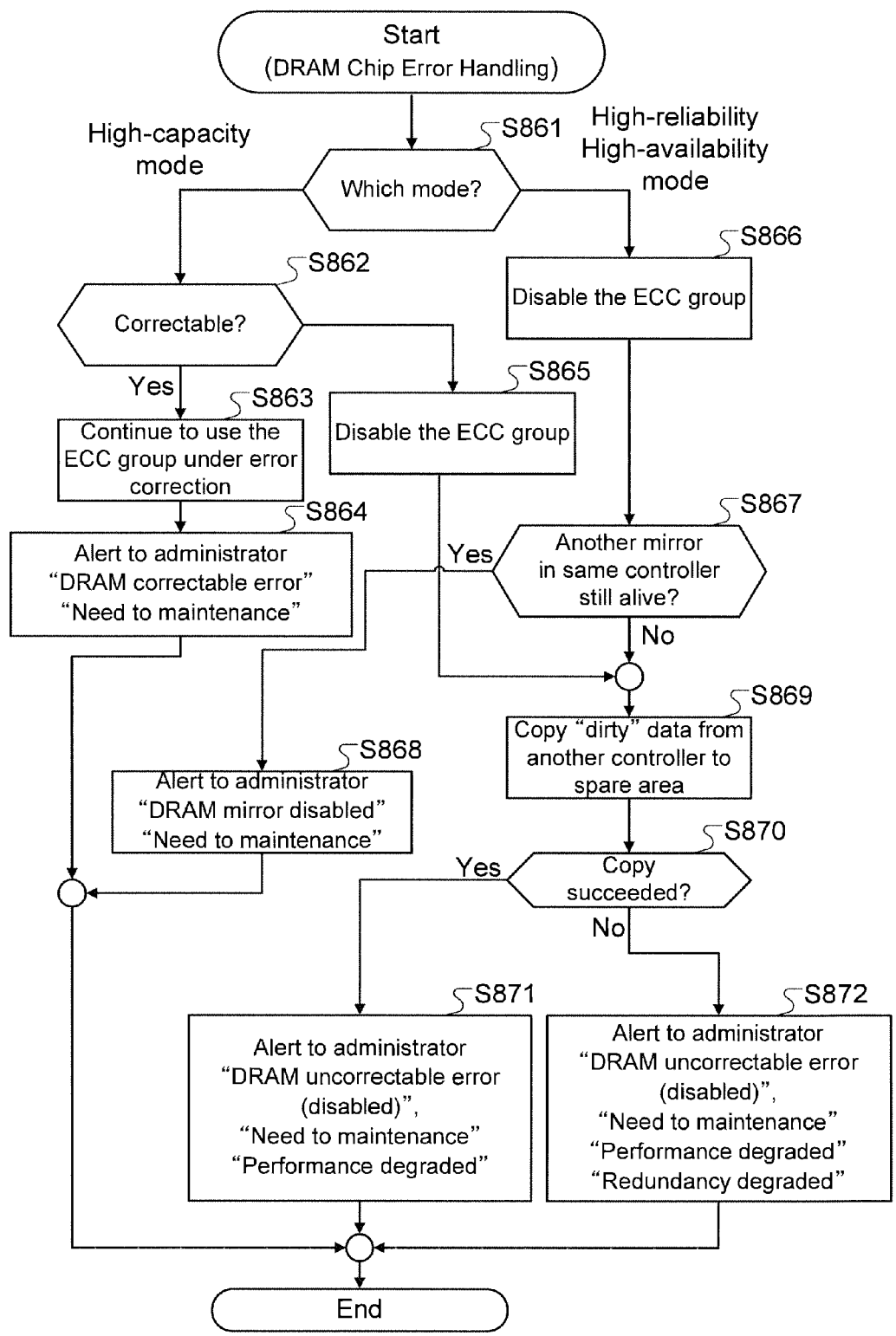
FIG. 18 is a flowchart showing an example of a processing flow that is executed in the case in which an error occurs in a DRAM chip in accordance with a third embodiment of the present invention.

FIG. 18 is a flowchart showing an example of a processing flow that is executed in the case in which an error occurs in a DRAM chip in accordance with a third embodiment of the present invention.

In the case in which the controller LSI 15 detects an error of the DRAM chip 71, the controller LSI 15 checks whether a DRAM chip 71 in which an error has occurred (hereafter referred to as an error chip) is a DRAM chip that belongs to a high capacity ECC group 55 or a DRAM chip that belongs to a high reliability high availability controller ECC group 56 (S861).

In the case in which the error chip 71 belongs to a high capacity ECC group 55, since it is better that an operation of the high capacity ECC group 55 is continued to the extent possible even if there is a risk of an ECC mis-correction, the controller LSI 15 checks whether or not an operation is still possible by a correction with an ECC (S862).

In the case in which an operation of the high capacity ECC group 55 is possible by a correction with an ECC (S862: Yes), the controller LSI 15 continues an operation of the high capacity ECC group 55 that is provided with the error chip 71 by an error correction (S863).

The controller LSI 15 then notifies the management computer 81 of the information that indicates at least one of that an error of a level that can be corrected has occurred in a memory and that a maintenance is needed (S864), and terminates the processing.

On the other hand, in the case in which an operation of the high capacity ECC group 55 cannot be continued by an error correction (S862: No), the controller LSI 15 disables the high capacity ECC group 55 (S865) and executes the processing of S869 and subsequent processing.

On the other hand, in the case in which it is decided that the error chip 71 belongs to the high reliability high availability in S861, since it is necessary that a risk of a mis-correction is avoided, the controller LSI 15 disables the corresponded ECC group 56 (S866).

The controller LSI 15 checks whether or not the other high reliability high availability ECC group 56 that has stored the same data is operated (S867). In the case in which the other high reliability high availability ECC group 56 is operated (S867: Yes), the controller LSI 15 uses the other high reliability high availability ECC group 56. The controller LSI 15 then notifies the management computer 81 of the information that indicates at least one of that a memory mirror has been disabled and that a maintenance is needed (S868), and terminates the processing.

On the other hand, in the case in which the other high reliability high availability ECC group 56 is also disabled (S867: No), the controller LSI 15 executes the disabling processing of S869 and subsequent steps.

In the case in which an area in which an error has occurred is a cache area that has stored the user data 311 (for instance, the dirty user data 311), the controller LSI 15 copies the user data that is equivalent to the user data 311 from the other redundant controller board 12 to another cache area of the controller board 12 that is provided with the controller LSI 15 (the high capacity ECC group that has not been disabled) (S869).

In the next place, the controller LSI 15 judges whether or not the copy has been succeeded (S870).

In the case in which the copy has been succeeded (S870: Yes), the controller LSI 15 notifies the management computer 81 of the information that indicates at least one of that an error of a level that cannot be corrected has occurred in the memory and the memory has been disabled, that a maintenance is needed, and that a performance is degraded (S871), and terminates the processing.

On the other hand, in the case in which the copy has been failed (S870: No), the controller LSI 15 notifies the management computer 81 of the information that indicates at least one of that an error of a level that cannot be corrected has occurred in the memory and the memory has been disabled, that a maintenance is needed, that a performance is degraded, and that the redundancy of the storage system is degraded (S872), and terminates the processing.

In accordance with the third embodiment, for the user data 311d, even in the case in which a mis-correction caused by more one point error occurs after one point error occurs (that is, even in the case in which two point error occurs, an error caused by an CRC or the like can be detected. Consequently, it is not necessary that a memory module is disabled by one point error, and an operation can be continued. By the above configuration, it is possible that the availability of the system is improved.

On the other hand, for the control data that is data in which an error detection with a CRC is impossible (for instance, the temporal data 32, a cache directory 33, and a snapshot bitmap 34), in the case in which a mis-correction occurs by more one point error occurs after one point error occurs, an error detection is impossible. Consequently, although it is preferable that a memory module is disabled in the stage in which one point error occurs, the availability is degraded. Therefore, by duplicating only the data furthermore, even in the case in which the memory module is disabled in the early stages, the availability can be prevented from being degraded. Although an extra memory capacity is consumed due to a duplication of the data, the control data that is duplicated is sufficiently smaller than the total sum of the user data. Accordingly, an influence to a memory capacity of the entire storage system is small. Since the ECC group 56 in which an error has occurred is disabled for one point error and a use of the other ECC group 56 in which an error has not occurred is continued, the reliability is covered.

Consequently, in accordance with the third embodiment, since data is read or written while a read/write unit of a signal for each of the DRAM chips 71 is specified to be 16 cycles of the maximum, the performance of the storage system 1 can be maintained. Moreover, in accordance with the third embodiment, it is possible that a reliability and availability for the storage system 1 are improved.

For the third embodiment, the high capacity ECC group is an ECC group that is provided with a capacity larger than that of the high reliability high availability ECC group, and the high reliability high availability ECC group is an ECC group that is provided with the reliability and availability higher than those of the high capacity ECC group.

While the preferred embodiments in accordance with the present invention have been described above, the preferred embodiments are examples for the description of the present invention, the scope of the present invention is not restricted to the embodiments, and various changes, modifications, and functional additions can be thus made without departing from the scope of the present invention. For instance, the maximum size of data that can be read or written in a unit time for the ECC group 52, 54, or 56 can be smaller than the maximum size of data that can be read or written in a unit time for the ECC group 51, 53, or 55.

REFERENCE SIGNS LIST

1: Storage system, 2: Memory module, 11: Storage controller, 20: Memory module group, 81: Management computer, 91: Host computer, 92: Drive enclosure, 93: Drive

The invention claimed is:

1. A storage control apparatus comprising:
a first memory area;
a second memory area;
and a controller that is coupled to the first memory area and the second memory area, wherein, when the controller writes first data to the first memory area, the controller is configured to add error detecting code of the a first kind to a first data element that is an element of the first data and is configured to then write the first data to the first memory area, and
wherein the controller is further configured to add error detecting code of a second kind to the first data;
wherein, when the controller writes the second data to the second memory area, the controller adds is further configured to add an error detecting code of the first kind to a second data element that is an element of the second data and is further configured to then write the second data to the second memory area,
wherein the first memory area comprises at least one first memory module group, each of the at least one first memory module group comprises at least one first memory module, and each of the at least one first memory module is provided with comprises a plurality of memory chips, the second memory area comprises at least one second memory module group, each of the at least one second memory module group comprises at least one second memory module, and each of the at least one second memory module comprises a plurality of memory chips,
wherein, (A) the first memory module includes exactly one error chip:
when the error chip is correctable, the controller is further configured to manage a first memory module group that comprises the error chips, and
when the error chips is not correctable, the controller is further configured to not manage the first memory module group that comprises the error chip,
wherein, (B) the second memory module includes exactly one error chip, the controller is configured to manage a second memory module group that comprises the error chip,
wherein (C) the first memory module group comprises more than one error chip or the second memory module group comprises more than one error chip, the controller is configured to not manage the first or second memory module group that comprises the more than one error chip,
wherein the first data is user data that is write target data or read target data and the error detecting code of the second kind that is added to the user data, and the second data is the control data to which an error detecting code is not added,
wherein data size of the first data is the same as that of the second data,
wherein a first number of memory chips that configure the second memory module group is larger than a second number of memory chips that configure the first memory module group,
wherein a third number of data transfer cycles from the controller to the second memory module group is smaller than a fourth number of data transfer cycles from the controller to the first memory module group.

2. A storage control apparatus according to claim 1 further comprising:
a first communication interface that is coupled to a host computer; and
a second communication interface that is coupled to a physical storage device,
wherein the controller is coupled to the first communication interface and the second communication interface, and is configured to execute, at least one of the following steps (W) or (R):
(W) receiving a write command and write target data from the host computer via the first communication interface, adding the error detecting code of the second kind to the write target data, and writing the write target data to the physical storage device via the second communication interface;
(R) receiving a read command from the host computer via the first communication interface, reading read target data from the physical storage device via the second communication interface, and transmitting the read target data to the host computer via the first communication interface,
wherein the second data is the control data to which an error detecting code is not added.

3. A storage control apparatus according to claim 2,
wherein the first kind is Error Correcting Code (ECC),
wherein the second kind is Cyclic Redundancy Check (CRC).

4. A storage control apparatus according to claim 1,
wherein the first number is N times as much as the second number;
wherein N is a natural number larger than 1,
wherein the third number is 1/N times the fourth number.

5. A storage control apparatus according to claim 1, wherein:
in (C), the controller disables the first or second memory module group that includes the more than one error chip.

6. A storage control apparatus according to claim 5,
wherein there is a multiplexed second memory module group in the second memory area,
wherein when the controller writes the second data element into the second memory area, the controller is configured to write the second data element and an error detecting code of the first kind that is added to the second data element into the multiplexed second memory module group,
wherein one of the multiplexed second memory module group is disabled in (B), and a second memory module group that is not disabled among the multiplexed second memory module group is managed as a memory module group that can be used.

7. A storage control apparatus according to claim 6, wherein:
a storage capacity of the second memory module group is smaller than that of the first memory module group.

8. A storage control apparatus according to claim 1, wherein:
a maximum data transfer length from the controller to the second memory module group is shorter than a maximum data transfer length from the controller to the first memory module group.

9. A storage control apparatus according to claim 1, wherein:
a storage capacity of the second memory module group is smaller than that of the first memory module group.

10. A storage control apparatus according to claim 1, wherein:
a maximum size of data that can be read or written in a unit time to the second memory module group is smaller than a maximum size of data that can he read or written in a unit time to the first memory module group.

11. A storage control apparatus according to claim 1, wherein:
the first data is a set of data and an error detecting code of the second kind that is added to the data.

12. A storage control apparatus according to claim 2, wherein the second data is data to which an error detecting code of the second kind is not added.

13. A storage control apparatus according to claim 2,
wherein the controller, the first communication interface, the second communication interface, the first memory area, and the second memory area are multiplexed,
wherein, in (A), the controller is configured to judge whether or not data in the first memory module group that comprises the error chip is correctable based on the error detecting code of the first kind, and the controller is further configured to execute the following steps when the judgment is that the error chip is not correctable:
(a1) disabling the first memory module group that comprises the error chip; and
(a2) when there is there is user data that has not been stored into the physical storage device in the first memory module group that comprises the error chip, copying user data that is equivalent to the user data from a first memory module group in a first memory area that does not include the error chip to a first memory module group that is not disabled in the first memory area that comprises the error chip.

14. A storage control method comprising the steps of:
when writing first data to a first memory area, adding an en error detecting code of a first kind to a first data element that is an element of the first data and writing the first data to the first memory area and adding error detecting code of a second kind to the first data, wherein the first memory area comprises at least one first memory module group, each of the first memory module group comprises at least one first memory module, and each of the first memory module comprises a plurality of memory chips;
when writing second data to a second memory area, adding error detecting code of the first kind to a second data element that is an element of the second data and then writing the second data to the second memory area, wherein the second memory area comprises at least one second memory module group, each of the second memory module group comprises at least one second memory module, and each of the second memory module comprises a plurality of memory chips;
(A) in which an error chip that is a memory chip that is provided with an error is a memory chip in the first memory module includes exactly one error chip:
when the error chip is correctable, managing a first memory module group that comprises the error chip; and
when the error chip is not correctable, disabling the first memory module group that includes the error chip,
(B) the second memory module includes exactly one error chip, managing a second memory module group that comprises the error chip,
(C) the first memory module group comprises more than one error chip or the second memory module comprises more than one error chip, managing the first or second memory module group that comprises the more than one error chip,
wherein the first data is user data that is write target data or read target data and the error detecting code of the second kind that is added to the user data, and the second data is the control data to which an error detecting code is not added, wherein data size of the first data is the same as that of the second data, wherein a first number of memory chips that configure the second memory module than a second number of memory chips that configure the first memory module group,
wherein a third number of data transfer cycles to the second memory module group is smaller than a fourth number of data transfer cycles to the first memory module group.

15. The storage control method according to claim 14,
wherein the first kind is Error Correcting Code (ECC),
wherein the second kind is Cyclic Redundancy Check (CRC).

16. The storage control method according to claim 14,
wherein the first number is N times as much as the second number,
wherein N is a natural number larger than 1.

17. The storage control method according to claim 14, wherein a maximum data transfer length to the second memory module group is shorter than a maximum data transfer length to the first memory module group.

18. The storage control method according to claim 14,
a storage capacity of the second memory module group is smaller than that of the first memory module group.

19. The storage control method according to claim 14, wherein a maximum size of data that can be read or written in a unit time to the second memory module group is smaller than a maximum size of data that can he read or written in a unit time to the first memory module group.

* * * * *